(12) United States Patent
Gupta et al.

(10) Patent No.: US 10,796,246 B2
(45) Date of Patent: Oct. 6, 2020

(54) BRAIN-MOBILE INTERFACE OPTIMIZATION USING INTERNET-OF-THINGS

(71) Applicants: Sandeep Gupta, Phoenix, AZ (US); Ayan Banerjee, Mesa, AZ (US); Mohammad Javad Sohankar Esfahani, Tempe, AZ (US); Seyed Koosha Sadeghi Oskooyee, Tempe, AZ (US)

(72) Inventors: Sandeep Gupta, Phoenix, AZ (US); Ayan Banerjee, Mesa, AZ (US); Mohammad Javad Sohankar Esfahani, Tempe, AZ (US); Seyed Koosha Sadeghi Oskooyee, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 227 days.

(21) Appl. No.: 15/857,794

(22) Filed: Dec. 29, 2017

(65) Prior Publication Data

US 2018/0189678 A1 Jul. 5, 2018

Related U.S. Application Data

(60) Provisional application No. 62/439,977, filed on Dec. 29, 2016.

(51) Int. Cl.
*G06F 16/00* (2019.01)
*G06N 20/00* (2019.01)
(Continued)

(52) U.S. Cl.
CPC .......... *G06N 20/00* (2019.01); *G05D 1/0088* (2013.01); *H04L 67/12* (2013.01); *H04W 40/24* (2013.01); *Y02D 30/40* (2018.01)

(58) Field of Classification Search
CPC ...... G06N 20/00; G05D 1/0088; H04L 67/12; Y02D 30/40; H04W 40/24
(Continued)

(56) References Cited

U.S. PATENT DOCUMENTS 9,064,243 B2 * 6/2015 Singh ...................... H04B 1/06
9,424,084 B2 8/2016 Gupta et al.
(Continued)

FOREIGN PATENT DOCUMENTS

| EP | 3064130 A1 | 9/2016 |
|---|---|---|
| WO | 2014018555 A1 | 1/2014 |
| WO | 2015095530 A1 | 6/2015 |

OTHER PUBLICATIONS

Alam, M.G.R., et al., "Cloud Based Mental State Monitoring System for Suicide Risk Reconnaissance Using Wearable Biosensors," Proceedings of 8th International Conference on Ubiquitous Information Management and Communication, ACM, Jan. 9-11, 2014, Siem Reap, Cambodia, 6 pages.
(Continued)

*Primary Examiner* — Thanh-Ha Dang
(74) *Attorney, Agent, or Firm* — Withrow & Terranova, P.L.L.C.

(57) ABSTRACT

A Brain-Mobile Interface (BMoI) system is provided. A control circuit is configured to execute a predictive model to generate a defined number of predicted signal features in future time based on a number of signal features extracted from a first type sensory data (e.g., electroencephalogram (EEG) data). A predicted future mental state(s) can thus be generated based on the number of predicted signal features
(Continued)

and used to trigger a corresponding action(s) in a BMoI application(s). In a non-limiting example, a second type sensory data (e.g., electrocardiogram (ECG) data) can be used to improve accuracy of the predictive model. By using the predicted signal features to generate the predicted future mental state(s) to control the BMoI application(s), it is possible to duty-cycle the BMoI system to help reduce power consumption and processing latency, thus allowing the BMoI application(s) to operate in real-time with improved accuracy and power consumption.

20 Claims, 13 Drawing Sheets

(51) Int. Cl.
    G05D 1/00      (2006.01)
    H04L 29/08    (2006.01)
    H04W 40/24   (2009.01)
(58) Field of Classification Search
    USPC ........................................................ 707/603
    See application file for complete search history.

(56) References Cited

U.S. PATENT DOCUMENTS

| | | | |
|---|---|---|---|
| 9,619,213 B2 | 4/2017 | Gupta et al. | |
| 9,626,521 B2 | 4/2017 | Gupta et al. | |
| 9,642,543 B2 | 5/2017 | Banerjee et al. | |
| 9,685,174 B2* | 6/2017 | Karam | A61B 5/7264 |
| 9,706,963 B2 | 7/2017 | Gupta et al. | |
| 10,074,028 B2 | 9/2018 | Gupta et al. | |
| 10,342,447 B2 | 7/2019 | Banerjee et al. | |
| 10,575,788 B2 | 3/2020 | Gupta et al. | |
| 10,671,735 B2 | 6/2020 | Gupta et al. | |
| 2002/0103512 A1* | 8/2002 | Echauz | G16H 50/20 607/9 |
| 2013/0317377 A1 | 11/2013 | Gupta et al. | |
| 2014/0278333 A1 | 9/2014 | Gupta et al. | |
| 2014/0316230 A1* | 10/2014 | Denison | A61B 5/4094 600/383 |
| 2015/0248470 A1* | 9/2015 | Coleman | G06F 16/285 707/740 |
| 2015/0261898 A1 | 9/2015 | Gupta et al. | |
| 2015/0277410 A1 | 10/2015 | Gupta et al. | |
| 2015/0297109 A1* | 10/2015 | Garten | A61B 5/0482 600/544 |
| 2015/0313496 A1* | 11/2015 | Connor | A61B 5/0478 600/301 |
| 2016/0313779 A1 | 10/2016 | Gupta et al. | |
| 2017/0220956 A1* | 8/2017 | Stephens | A63F 13/67 |
| 2018/0301061 A1 | 10/2018 | Paudyal et al. | |
| 2019/0188587 A1 | 6/2019 | Gupta et al. | |
| 2019/0212803 A1 | 7/2019 | Gupta et al. | |
| 2019/0354087 A1 | 11/2019 | Gupta et al. | |
| 2020/0108203 A1 | 4/2020 | Lamrani et al. | |

OTHER PUBLICATIONS

Banerjee, A., et al., "Health-Dev: Model Based Development of Pervasive Health Monitoring Systems," 2012 Ninth International Conference on Wearable and Implantable Body Sensor Networks, May 9-12, 2012, London, United Kingdom, 6 pages.

Hugdahl, K., et al., "Heart-Rate responses (HRR) to lateralized visual stimuli," The Pavlovian Journal of Biological Science, vol. 18, Issue 4, Oct. 1983, pp. 186-198.

Jouven, X., et al., "Excessive heart rate increase during mild mental stress in preparation for exercise predicts sudden death in the general population," European Heart Journal, vol. 30, Available online Apr. 28, 2009, pp. 1703-1710.

Khushaba, R.N., et al., "Driver drowsiness classification using fuzzy wavelet-packet-based feature-extraction algorithm," IEEE Transactions on Biomedical Engineering, vol. 58, Issue 1, Sep. 20, 2010, pp. 121-131.

Li, Y., et al., "Can Mobile Cloudlets Support Mobile Applications?," IEEE INFOCOM 2014—IEEE Conference on Computer Communications, Apr. 27-May 2, 2014, Toronto, Ontario, Canada, 9 pages.

Lim, C.K.A., et al., "Analysis of Single-Electrode EEG Rhythms Using MATLAB to Elicit Correlation with Cognitive Stress," International Journal of Computer Theory and Engineering, vol. 7, Issue 2, Apr. 2015, pp. 149-155.

Mak, J.N., et al., "Clinical Applications of Brain-Computer Interfaces: Current State and Future Prospects," IEEE Reviews in Biomedical Engineering, vol. 2, Dec. 1, 2009, pp. 187-199.

Marchesi, M., et al., "BRAVO: A BRAin Virtual Operator for Education Exploiting Brain-Computer Interfaces," CHI 2013 Extended Abstracts, Apr. 27-May 3, 2013, Paris, France, pp. 3091-3094.

Mulholland, T., et al., "Feedback Control and Quantification of the Response of EEG Alpha to Visual Stimulation," Biofeedback and Self-Regulation, vol. 1, Issue 4, Jul. 1976, pp. 411-422.

Nabar, S., et al., "GeM-REM: Generative Model-Driven Resource Efficient ECG Monitoring in Body Sensor Networks," 2011 International Conference on Body Sensor Networks, May 23-25, 2011, Dallas, Texas, USA, 6 pages.

Nicolas-Alonso, L.F., et al., "Brain Computer Interfaces, a Review," Sensors, vol. 12, Issue 2, Jan. 31, 2012, pp. 1211-1279.

Oskooyee, K.S., et al., "The Shadow of a Real Conscious Mind," IEEE 10th International Conference on Cognitive Informatics and Cognitive Computing (ICCI-CC'11), Aug. 18-20, 2011, Banff, Alberta, Canada, pp. 412-418.

Oskoyee, K.S., et al., "Neuro Movie Theatre: A Real-Time Internet-Of-People based Mobile Application," The 16th International Workshop on Mobile Computing Systems and Applications, ACM HotMobile, Feb. 12-13, 2015, Santa Fe, New Mexico, USA, 1 page.

Pore, M., et al., "Enabling Real-Time Collaborative Brain-Mobile Interactive Applications on Volunteer Mobile Devices," Proceedings of the 2nd International Workshop on Hot Topics in Wireless, HotWirelss, ACM, Sep. 11, 2015, Paris, France, pp. 46-50.

Sadeghi, K., et al., "SafeDrive: An Autonomous Driver Safety Application in Aware Cities," 2016 IEEE International Conference on Pervasive Computing and Communication Workshops (PerCom Workshops), Mar. 14-18, 2016, Sydney, Australia, 6 pages.

Samanta, B., "Prediction of chaotic time series using computational intelligence," Expert Systems with Applications, vol. 38, Issue 9, Sep. 2011, pp. 11406-11411.

Sohankar, J., et al., "E-BIAS: A Pervasive EEG-Based Identification and Authentication System," Proceedings of the 11th ACM Symposium on QoS and Security for Wireless and Mobile Networks, Nov. 2-6, 2015, Cancun, Mexico, pp. 165-172.

Takahashi, T., et al., "Changes in EEG and autonomic nervous activity during meditation and their association with personality traits," International Journal of Psychophysiology, vol. 55, Issue 2, Feb. 2005, pp. 199-207.

Tan, B.H., "Using a Low-cost EEG Sensor to Detect Mental States," Dissertation submitted in partial fulfillment of the requirements for the Degree of Master of Science, School of Computer Science, Computer Science Department, Carnegie Mellon University, Pittsburgh, Pennsylvania, USA, Aug. 2012, 77 pages.

Yuan, Y., et al., "Toward Unobtrusive Measurement of Reading Comprehension Using Low-Cost EEG," Proceedings of the Fourth International Conference on Learning Analytics and Knowledge, Mar. 24-28, 2014, New York, New York, USA, pp. 54-58.

Zao, J.K., et al., "Pervasive brain monitoring and data sharing based on multi-tier distributed computing and linked data technology," Frontiers in Human Neuroscience, vol. 8, Jun. 3, 2014, Article 370, 16 pages.

Li, Y. et al., "Communication Energy Modeling and Optimization through Joint Packet Size Analysis of BSN and WiFi Networks", IEEE Transactions on Parallel and Distributed Systems, Sep. 2013 [IEEE Date of Publication: Sep. 2012], vol. 24, No. 9, pp. 1741-1751 <DOI:10.1109/TPDS.2012.264>.

Ramirez-Cortes, J. et al., "P-300 RhythmDetection Using ANFIS Algorithm and Wavelet Feature Extraction in EEG Signals", Pro-

(56) References Cited

OTHER PUBLICATIONS ceedings of the World Congress on Engineering and Computer Science 2010 (San Francisco, USA, Oct. 20-22, 2010,), 2010, vol. I, 5 pages.

Wang, Y. et al., "Mobile-Edge Computing: Partial Computation Offloading Using Dynamic Voltage Scaling", IEEE Transactions on Communications, Oct. 2016 [IEEE date of publication: Aug. 2016], vol. 64, No. 10, pp. 4268-4282 <DOI:10.1109/TCOMM.2016.2599530>.

U.S. Appl. No. 16/775,984, Banerjee et al., filed Jan. 19, 2020.

* cited by examiner

BRAIN-MOBILE INTERFACE OPTIMIZATION USING INTERNET-OF-THINGS

RELATED APPLICATIONS

This application claims the benefit of provisional patent application Ser. No. 62/439,977, filed Dec. 29, 2016, the disclosure of which is hereby incorporated herein by reference in its entirety.

GOVERNMENT SUPPORT

This work has been partly funded by CNS grant #1218505, IIS grant #1116385, and NIH grant # EB019202. The U.S. government has certain rights in the invention.

FIELD OF THE DISCLOSURE

The technology of the disclosure relates generally to a brain-mobile interface.

BACKGROUND

Pervasive Brain-Mobile Interface (BMoI) is a new trend and has been made feasible due to the advent of wearable dry contact Electroencephalogram (EEG) sensors such as NeuroSky. Potential BMoI applications include pervasive monitoring of mental states, enhancing human performance by recognizing one's cognitive abilities, controlling prosthetic organs in a mobile setting, and security. The principle challenges in the BMoI applications arise from low accuracy of commercially available wearable brain sensors, real-time online processing of brain data, as well as power and computational resource constraints in mobile communication devices.

The Internet of Things (IoT) technology provides sensing and computational resources that can be used to enhance performance of the BMoI applications. IoT enables multi-modal sensing using other physiological sensors (e.g., heart rate sensors) and possibly improving accuracy in the BMoI applications. In addition, IoT can exploit available network devices with computational capability for distributing and off-loading execution of complex algorithms in a timely and energy-efficient manner. However, offloading computational tasks to the IoT can raise latency issues that may hinder real-time operation of the BMoI applications. Hence, it may be desirable to analyze three-way trade-off between accuracy, real-time operation, and power consumption of BMoI architectures to optimize the BMoI applications in the context of IoT.

SUMMARY

Embodiments of the disclosure relate to a Brain-Mobile Interface (BMoI) system. In examples discussed herein, a control circuit is configured to execute a predictive model to generate a defined number of predicted signal features in future time based on a number of signal features extracted from a first type sensory data (e.g., electroencephalogram (EEG) data). A predicted future mental state(s) (e.g., human nervousness levels in response to a stimulus) can thus be generated based on the number of predicted signal features and used to trigger a corresponding action(s) in a BMoI application(s). In a non-limiting example, a second type sensory data (e.g., electrocardiogram (ECG) data) can be used to improve accuracy of the predictive model. By using the predicted signal features to generate the predicted future mental state(s) to control the BMoI application(s), it is possible to duty-cycle the BMoI system to help reduce power consumption and processing latency, thus allowing the BMoI application(s) to operate in real-time with improved accuracy and power consumption.

In one aspect, a BMoI system is provided. The BMoI system includes an input interface coupled to a selected communication medium. The BMoI system also includes an output interface coupled to the selected communication medium. The BMoI system also includes a control circuit coupled to the input interface and the output interface. The control circuit is configured to receive a first type sensory data via the input interface. The control circuit is also configured to extract a number of signal features from the received first type sensory data. The control circuit is also configured to execute a predictive model to generate a defined number of predicted signal features based on the number of extracted signal features in at least one prediction window. The control circuit is also configured to generate at least one predicted future mental state based on the defined number of predicted signal features. The control circuit is also configured to provide the at least one predicted future mental state to the output interface.

In another aspect, a method for optimizing a BMoI system using Internet-of-Things (IoT) is provided. The method includes receiving a first type sensory data. The method also includes extracting a number of signal features from the received first type sensory data. The method also includes executing a predictive model to generate a defined number of predicted signal features based on the number of extracted signal features in at least one prediction window. The method also includes generating at least one predicted future mental state based on the defined number of predicted signal features.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 10:
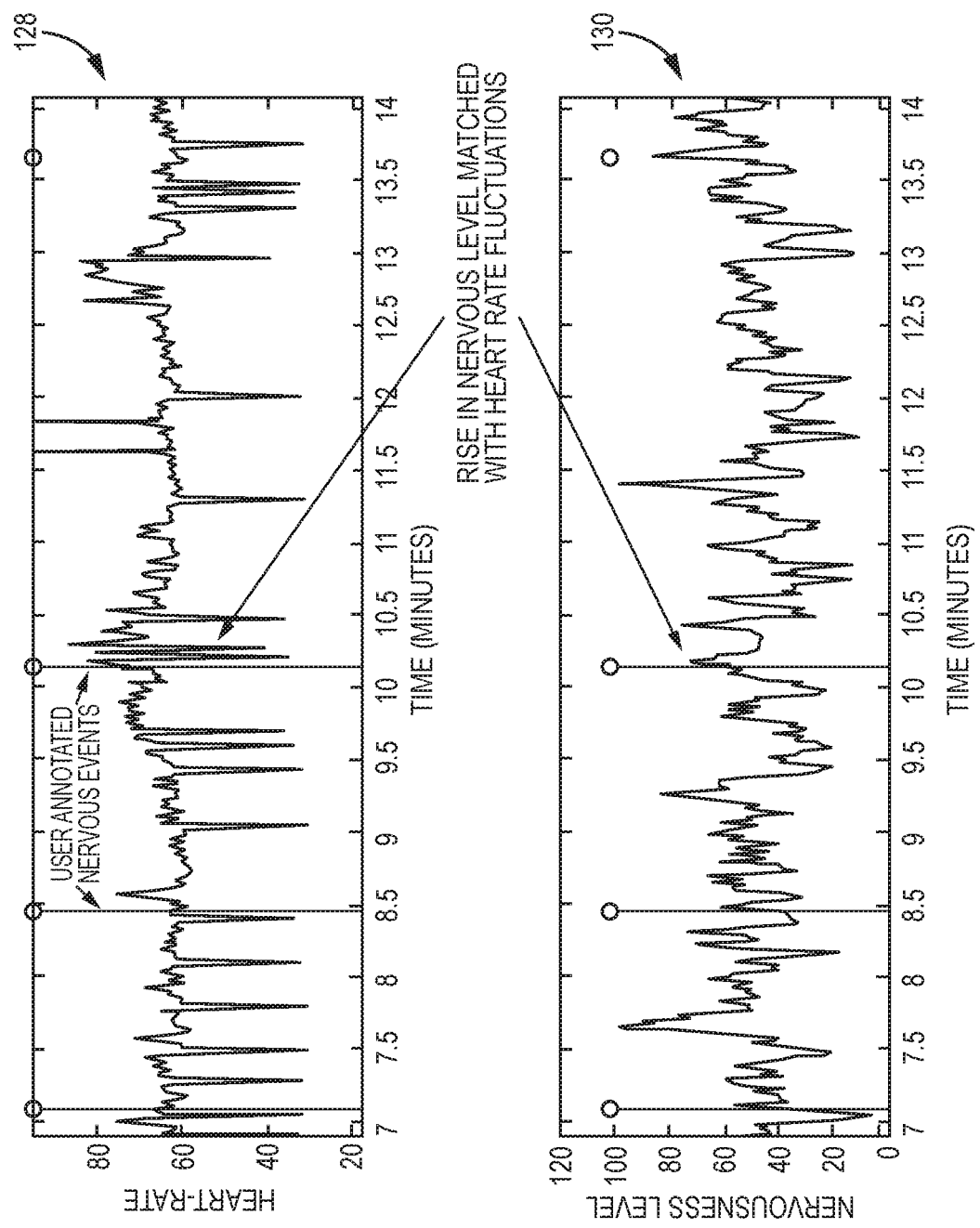
Figure 11:
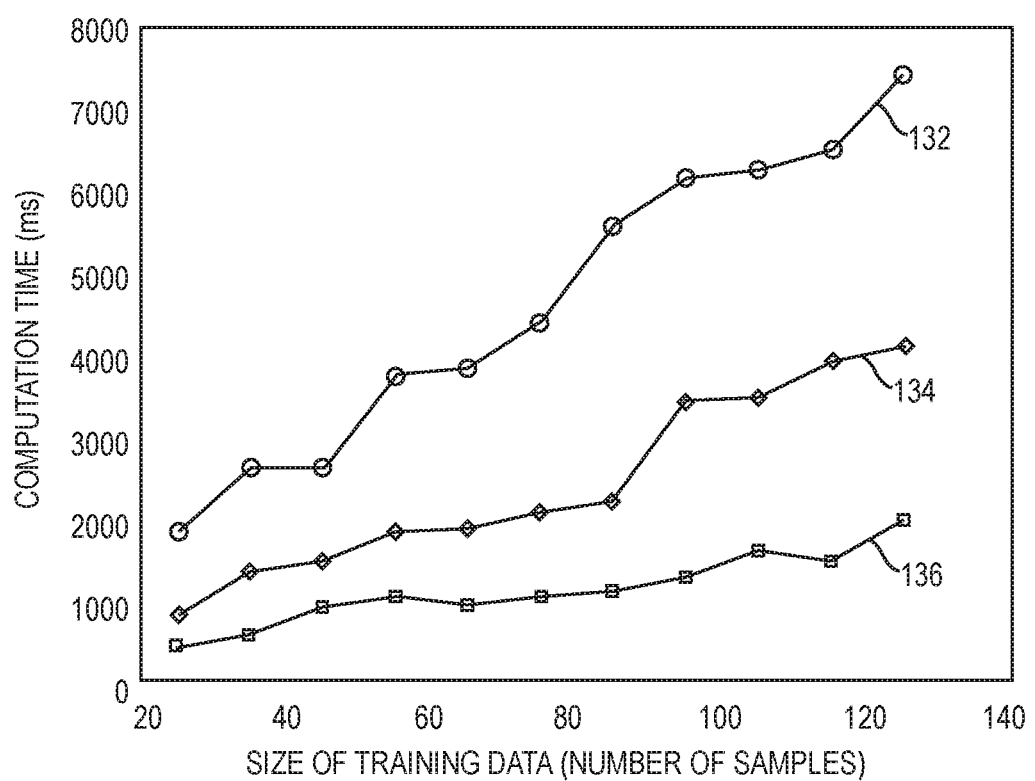

FIG. 10 provides an exemplary illustration of expected correlation between electroencephalogram (EEG) and electrocardiogram (ECG) signals; and FIG. 11 provides an exemplary illustration of a relationship between training data size and computation time.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a Brain-Mobile Interface (BMoI) system. In examples discussed herein, a control circuit is configured to execute a predictive model to generate a defined number of predicted signal features in future time based on a number of signal features extracted from a first type sensory data (e.g., electroencephalogram (EEG) data). A predicted future mental state(s) (e.g., human nervousness levels in response to a stimulus) can thus be generated based on the number of predicted signal features and used to trigger a corresponding action(s) in a BMoI application(s). In a non-limiting example, a second type sensory data (e.g., electrocardiogram (ECG) data) can be used to improve accuracy of the predictive model. By using the predicted signal features to generate the predicted future mental state(s) to control the BMoI application(s), it is possible to duty-cycle the BMoI system to help reduce power consumption and processing latency, thus allowing the BMoI application(s) to operate in real-time with improved accuracy and power consumption.

Figure 1:
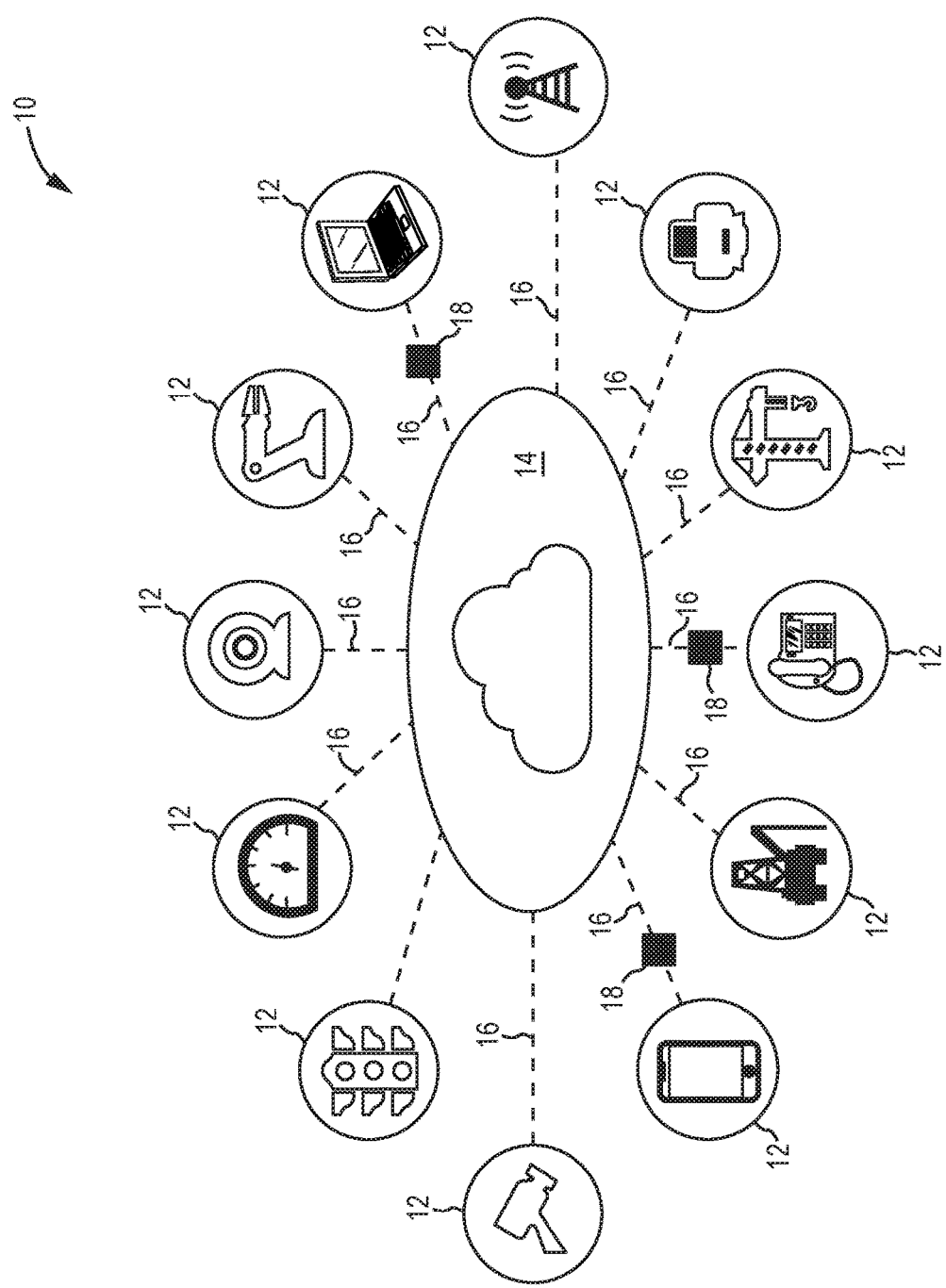
FIG. 1 is a schematic diagram of an exemplary Internet-of-Things (IoT) system configured to support fog computing.

Before discussing the BMoI system of the present disclosure, a brief overview of fog computing in the context of Internet-of-Things (IoT) is first provided with reference to FIG. 1. A brief discussion of conventional BMoI system is then provided with references to FIGS. 2A-2C. The discussion of specific exemplary aspects of a BMoI system, which may be optimized using IoT, starts below with reference to FIG. 3.

FIG. 1 is a schematic diagram of an exemplary IoT system 10 configured to support fog computing. The IoT system 10 includes a large number of things 12, which may be devices (e.g., smartphones, computers, printers, etc.) and sensors (e.g., heartrate monitors, utility meters, etc.). The large number of things 12 is connected to a cloud 14 via a number of communication mediums 16. The communication mediums 16 can be wired communication mediums, such as coaxial cable, digital subscriber line (DSL), fiber-optical cable, and/or wireless communication mediums used by such wireless technologies as long-term evolution (LTE), Wi-Fi, and Bluetooth. Together, the IoT system 10 enables the large number of things 12 to communicate with one another.

Notably, the large number of things 12 can generate an unprecedented amount of data in a large variety of types, thus placing tremendous pressure on hardware and/or software infrastructures enabling, controlling, managing, and securing the communications in the IoT system 10. In addition, many applications running on the large number of things 12 require real-time response from the cloud 14, thus making it even more challenging for the IoT system 10.

Unfortunately, traditional cloud computing architecture, which moves all data from a cloud edge to a centralized data center for processing, is unable to live up to these new challenges. To complicate things even further, the cloud 14 is configured to operate primarily based on Internet-protocol (IP). As a result, the centralized data center needs to perform protocol and/or data format conversions.

As a result, a number of fog servers 18 are added to the IoT system 10. The fog servers 18 are deployed along a network edge, closer to the things 12. The fog servers 18 can be configured to analyze data communicated by the things 12, perform protocol conversion, and provide converted data to the central data center in the cloud 14. More over, the fog servers 18 may prioritize delay sensitive data (e.g., real-time data) over delay insensitive data (e.g., best-effort data). By being deployed closer to the things 12 and configured to prioritize delay sensitive data, the fog servers 18 can help reduce data processing and/or propagation latency, thus making it possible to support a BMoI system in real-time using the IoT system 10.

BMoI systems provide cost-effective and noninvasive applications that use interactions between the human brain and mobile devices. Three types of conventional BMoI system architectures are now discussed with reference to FIGS. 2A-2C.

Figure 2A:
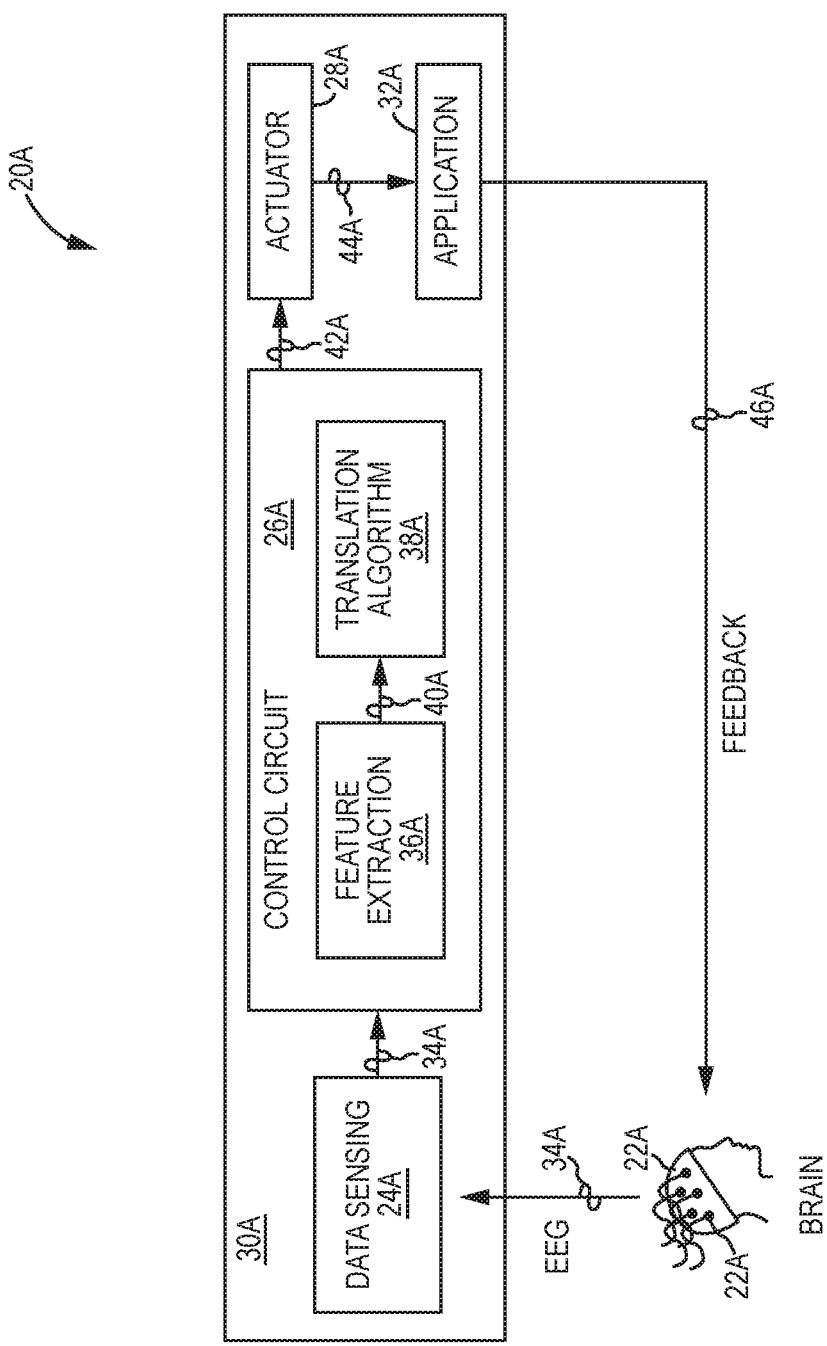
FIGS. 2A-2C are schematic diagrams of exemplary conventional Brain-Mobile Interface (BMoI) systems.

FIG. 2A is a schematic diagram of an exemplary conventional BMoI system 20A. The conventional BMoI system 20A includes a wearable EEG sensor(s) 22A, data sensing circuitry 24A, a control circuit 26A, and actuator circuitry 28A. The data sensing circuitry 24A, the control circuit 26A, and the actuator circuitry 28A may be incorporated into a mobile communication device 30A, which can be a smartphone for example, supporting a BMoI-based application 32A.

Electrical currents through neurons caused by brain activities produce potential differences in the order of microvolts (e.g., 5-100 µV), which when measured by a sensor result in electroencephalogram (EEG) waves. Typically the amplitude of EEG signals is measured by placing EEG electrodes on the surface of the scalp. EEG signals are usually decomposed in several frequency bands, which are also know as signal features. Each band contains signals associated with a particular mental state. For example, 0.5-3.5 Hz ($\delta$ band) indicates a sleep state, 4-7 Hz ($\theta$ band) indicates a drowsy state, 8-13 Hz ($\alpha$ band) indicates a relaxation or rest state, 14-30 Hz ($\beta$ band) indicates an alertness state, and 30-100 Hz ($\gamma$ band) indicates a perception state.

In the conventional BMoI system 20A, the EEG wearable sensor(s) 22A is attached to a human brain to collect raw EEG data 34A and provide the raw EEG data 34A to the data sensing circuitry 24A, which in turn provides the raw EEG data 34A to the control circuit 26A.

The control circuit 26A includes feature extraction (FE) circuitry 36A and translation algorithm (TA) circuitry 38A. After receiving the raw EEG data 34A from the data sensing circuitry 24A, the FE circuitry 36A extracts a number of signal features 40A using such methods as Fast Fourier Transform (FFT). In a non-limiting example, the extracted signal features 40A can include the frequency bands (e.g., $\delta$ band, $\theta$ band, $\alpha$ band, $\beta$ band, and/or $\gamma$ band) decomposed from the raw EEG data 34A. The signal features 40A provide more information about the characteristics of a given signal that can be used to recognize an individual's mental state (e.g., sleep state, drowsy state, relaxation state, alertness state, and perception state). The TA circuitry 38A receives and maps the extracted signal features 40A to a specific mental state(s) 42A. Machine learning techniques are widely used for the signal features mapping. The actuator circuitry 28A receives the specific mental state(s) 42A and generates a trigger signal 44A to trigger an action in the BMoI-based application 32A. Subsequently, the BMoI-based application 32A provides feedback 46A (e.g., visual stimuli, audible alert, vibration, etc.) to the user.

The TA circuitry 38A is configured to translate the extracted signal features 40A to the specific mental state(s) 42A based on Synchronous Sensing of EEG-driven Control and feedback (SSEC) translation algorithm. The SSEC translation algorithm reflects a basic operating model in which the wearable EEG sensor(s) 22A, the control circuit 26A, and the actuator circuitry 28A are time synchronized. Given that the raw EEG data 34A collected by the wearable EEG sensor(s) 22A can have low signal quality, it can lead to low accuracy of mental state recognition. Besides, the recognition requires complex signal processing that increases the system latency and computational energy.

Figure 2B:
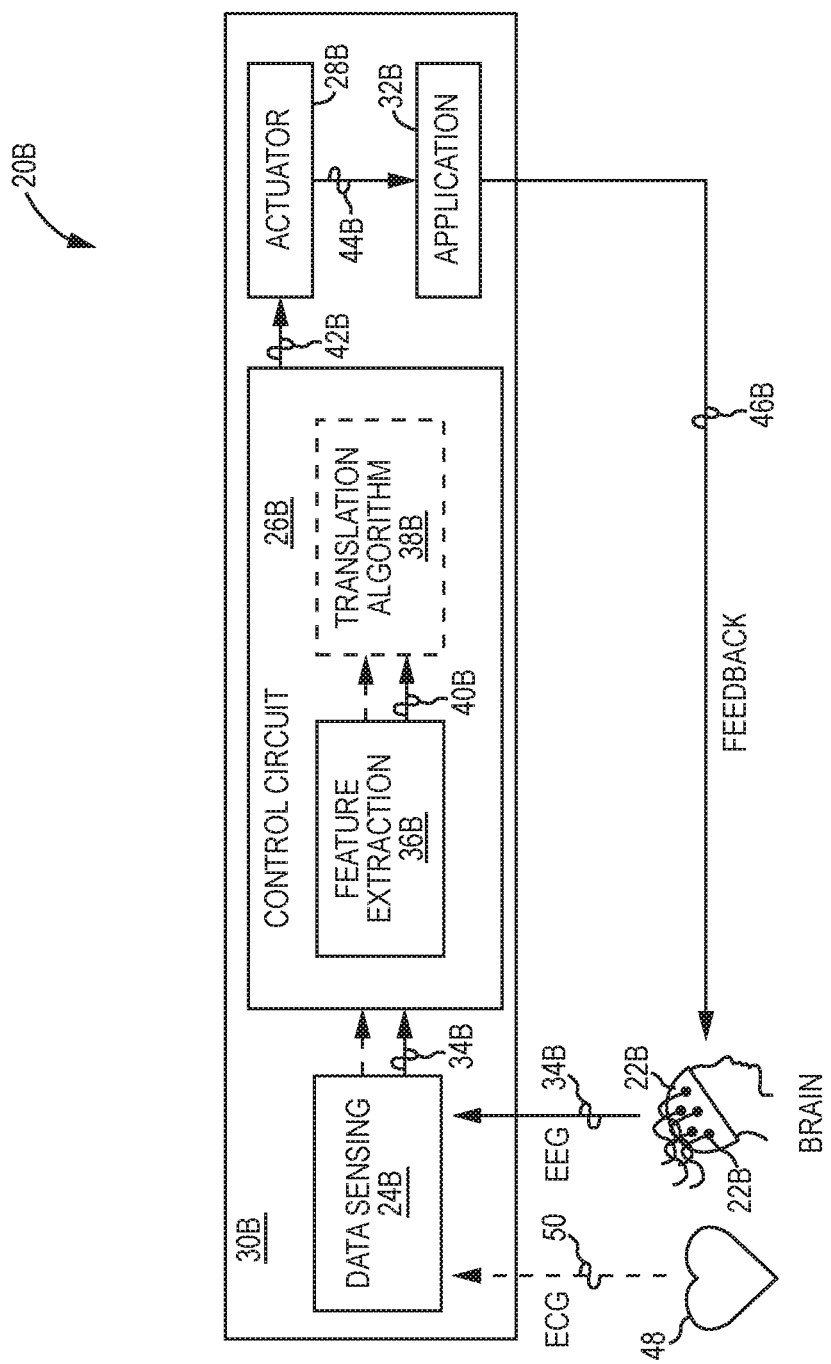

FIG. 2B is a schematic diagram of an exemplary conventional BMoI system 20B. The conventional BMoI system 20B includes a wearable EEG sensor(s) 22B, data sensing circuitry 24B, a control circuit 26B, and actuator circuitry 28B. The data sensing circuitry 24B, the control circuit 26B, and the actuator circuitry 28B may be incorporated into a mobile communication device 30B, which can be a smartphone for example, supporting a BMoI-based application 32B.

In the conventional BMoI system 20B, the EEG wearable sensor(s) 22B is attached to a human brain to collect raw EEG data 34B and provide the raw EEG data 34B to the data sensing circuitry 24B, which in turn provides the raw EEG data 34B to the control circuit 26B.

The control circuit 26B includes FE circuitry 36B and TA circuitry 38B. After receiving the raw EEG data 34B from the data sensing circuitry 24B, the FE circuitry 36B extract a number of signal features 40B using such methods as FFT. In a non-limiting example, the extracted signal features 40B can include the frequency bands (e.g., $\delta$ band, $\theta$ band, $\alpha$ band, $\beta$ band, and/or $\gamma$ band) decomposed from the raw EEG data 34B. The signal features 40B provide more information about the characteristics of a given signal that can be used to recognize an individual's mental state (e.g., sleep state, drowsy state, relaxation state, alertness state, and perception state). The TA circuitry 38B receives and maps the extracted signal features 40B to a specific mental state(s) 42B. Machine learning techniques are widely used for the signal features mapping. The actuator circuitry 28B receives the specific mental state(s) 42B and generates a trigger signal 44B to trigger an action in the BMoI-based application 32B. Subsequently, the BMoI-based application 32B provides feedback 46B (e.g., visual stimuli, audible alert, vibration, etc.) to the user.

As seen in FIG. 2B, the wearable EEG sensor(s) 22B, which can be inaccurate, is associated with a secondary wearable sensor(s) 48 to improve accuracy of mental state recognition. For example, nervousness can be captured by responses in both the brain and heart. As such, the secondary wearable sensor(s) 48 can be an electrocardiogram (ECG) sensor configured to collect raw ECG data 50.

The TA circuitry 38B is configured to translate the extracted signal features 40B to the specific mental state(s) 42B based on Asynchronous Multi-sensory Adaptive Control and feedback (AMAC) translation algorithm. The AMAC translation algorithm can be adapted based on validation from the cardiac response provided in the raw ECG data 50. Repeated adaptation can possibly lead to an accurate controller such that each mental state recognized from EEG corresponds to an appropriate response from the secondary wearable sensor(s) 48. However, the AMAC translation algorithm is neither real time nor energy efficient. Moreover, processing related to the raw ECG data 50 increases latency and power consumption of the mobile communication device 30B. Studies show that a human brain can respond to stimuli in about 250 milliseconds, while changes in the heart rate are only reflected after 3-4 seconds. As such, the raw ECG data 50 lags behind the raw EEG data 34B by approximately 3-4 seconds, and further increases the computational load of the control circuit 26B.

Figure 2C:
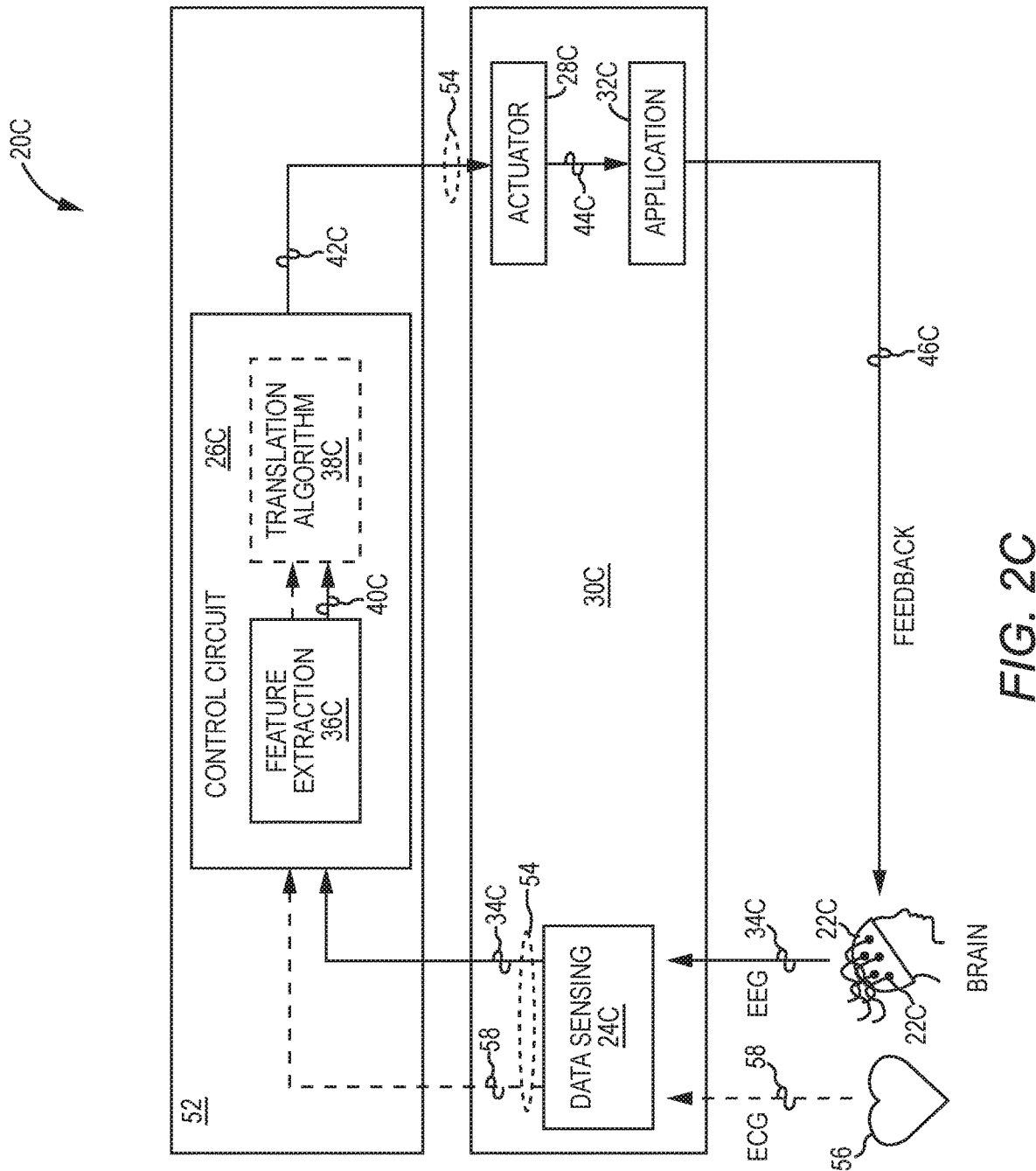

FIG. 2C is a schematic diagram of an exemplary conventional BMoI system 20C. The conventional BMoI system 20C includes a wearable EEG sensor(s) 22C, data sensing circuitry 24C, a control circuit 26C, and actuator circuitry 28C. The data sensing circuitry 24C and the actuator circuitry 28C may be incorporated into a mobile communication device 30C, which can be a smartphone for example, supporting a BMoI-based application 32C. The control circuit 26C, on the other hand, is provided in an IoT fog server 52. The mobile communication device 30C is communicatively coupled to the IoT fog server 52 via a communication medium 54, which may be a wired communication medium or a wireless communication medium.

In the conventional BMoI system 20C, the EEG wearable sensor(s) 22C is attached to a human brain to collect raw EEG data 34C and provide the raw EEG data 34C to the data sensing circuitry 24C, which in turn provides the raw EEG data 34C to the control circuit 26C over the communication medium 54.

The control circuit 26C includes FE circuitry 36C and TA circuitry 38C. After receiving the raw EEG data 34C from the data sensing circuitry 24C, the FE circuitry 36C extracts a number of signal features 40C using methods such as FFT. In a non-limiting example, the extracted signal features 40C can include the frequency bands (e.g., δ band, θ band, α band, β band, and/or γ band) decomposed from the raw EEG data 34C. The signal features 40C provide more information about the characteristics of a given signal that can be used to recognize an individual's mental state (e.g., sleep state, drowsy state, relaxation state, alertness state, and perception state). The TA circuitry 38C receives and maps the extracted signal features 40C to a specific mental state(s) 42C. Machine learning techniques are widely used for the signal features mapping. The actuator circuitry 28C receives the specific mental state(s) 42C over the communication medium 54 and generates a trigger signal 44C to trigger an action in the BMoI-based application 32C. Subsequently, the BMoI-based application 32C provides a feedback 46C (e.g., visual stimuli, audible alert, vibration, etc.) to the user.

The conventional BMoI system 20C further includes a secondary wearable sensor(s) 56, which can be an ECG sensor configured to collect raw ECG data 58. The data sensing circuitry 24C receives the raw ECG data 58 and provides the received raw ECG data 58 to the control circuit 26C over the communication medium 54.

As seen in FIG. 2C, it is expected that off-loading the computation from the mobile communication device 30C to the IoT fog server 52 can reduce latency and power consumption. It is noteworthy that using the IoT fog server 52 adds some latencies and communication power consumption. Therefore, offloading computational tasks to the IoT fog server 52 can be beneficial when latencies and computational power usage on the mobile communication device 30C are higher than the communication costs. However, providing real-time support for the BMoI-based application 32C in the conventional BMoI system 20C remains a challenge.

Figure 3:
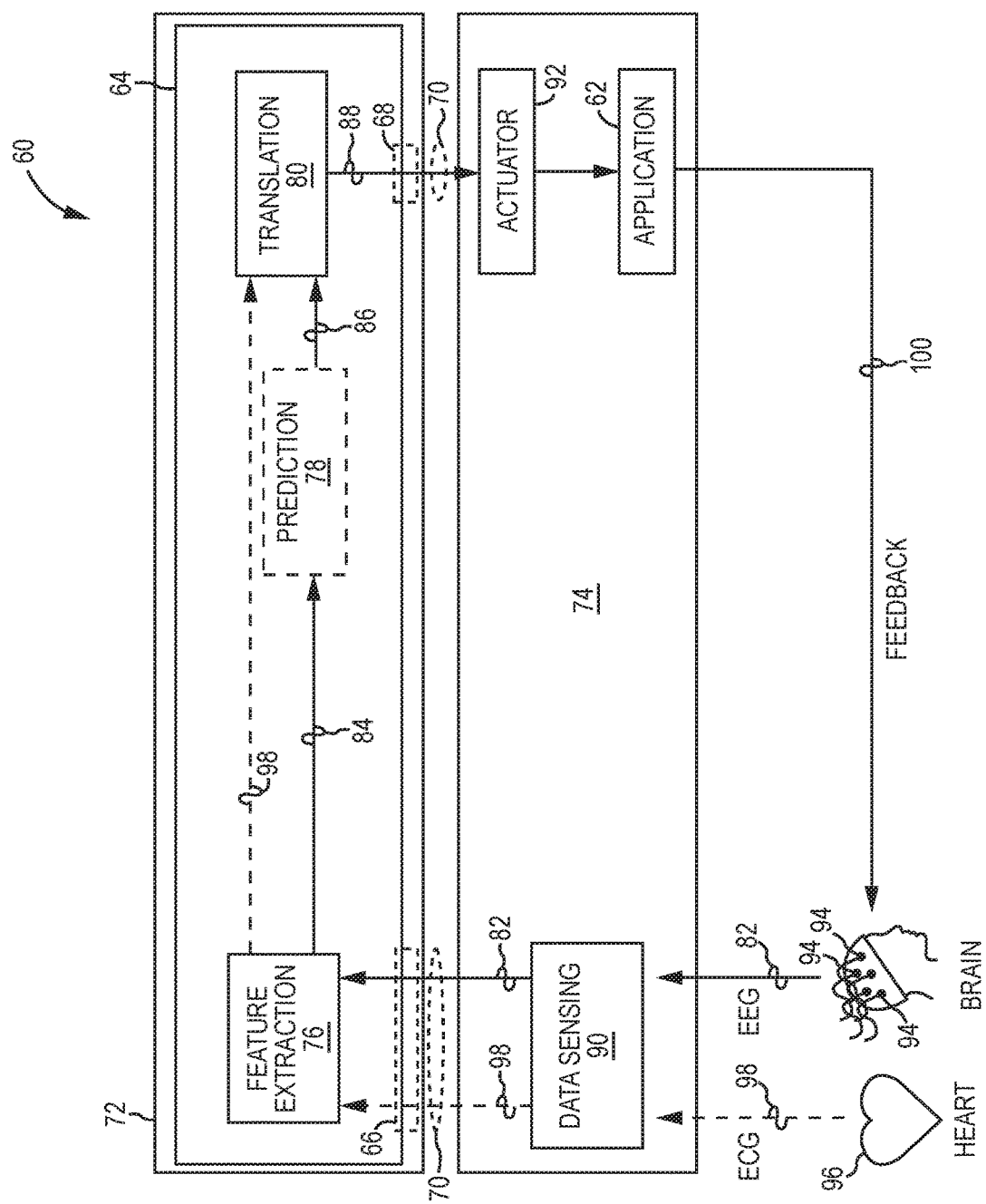
FIG. 3 is a schematic diagram of an exemplary BMoI system configured to support a BMoI application(s) with improved accuracy, latency, and power consumption compared to the conventional BMoI systems of FIGS. 2A-2C.

In summary, the conventional BMoI systems 20A of FIG. 2A, 20B of FIG. 2B, and 20C of FIG. 2C all have difficulties in supporting a BMoI application with desired accuracy, latency, and power consumption. Hence, it may be desirable to provide an enhanced BMoI system that can support a real-time BMoI application with improved accuracy and power consumption. In this regard, FIG. 3 is a schematic diagram of an exemplary BMoI system 60 configured to support a BMoI application(s) 62 with improved accuracy, latency, and power consumption compared to the conventional BMoI systems 20A of FIG. 2A, 20B of FIG. 2B, and 20C of FIG. 2C.

In an exemplary BMoI system discussed herein, a control circuit is configured to execute a predictive model to generate a defined number of predicted signal features in future time based on a number of signal features extracted from a first type sensory data (e.g., EEG data). A predicted future mental state(s) can thus be generated based on the number of predicted signal features and used to trigger a corresponding action(s) in the BMoI application(s) 62. In a non-limiting example, a second type sensory data (e.g., ECG data) can be used to improve accuracy of the predictive model. End-to-end latency analysis is performed to determine appropriate timing constraint for the predictive model such that overall end-to-end delay of the BMoI system 60 does not exceed a typical human response time to a stimulus, thus allowing the BMoI system 60 to operate in real-time. In a real-time setting, the number of predicted signal features in the future (e.g., a prediction window) should be greater than the end-to-end latency of the BMoI system 60. As such, the time spent in computation of the predictive models gets rewarded with real time access to the predicted future signal features. Thus, by using the predicted signal features to generate the predicted future mental state(s) to control the BMoI application(s) 62, it is possible to duty-cycle the BMoI system 60 to help reduce power consumption and processing latency, thus allowing the BMoI application(s) 62 to operate in real-time with improved accuracy and power consumption.

The BMoI system 60 is an Asynchronous Multi-sensory Model Predictive Control and feedback (AMMPC) BMoI system. The BMoI system 60 includes a control circuit 64, an input interface 66, and an output interface 68. The control circuit 64 may be a microprocessor, a central processing unit (CPU), or a field-programmable gate array (FPGA), for example. The input interface 66 and the output interface 68 are coupled to a selected communication medium 70. The selected communication medium 70 may be a wired communication medium, such as a coaxial cable, an optical-fiber cable, or a digital subscriber line (DSL). The selected communication medium 70 may also be a wireless communication medium supporting such wireless technologies as long-term evolution (LTE), infrastructure-based Wi-Fi (e.g., 802.11a/b/g/n/ac), Wi-Fi direct, Bluetooth, and so on.

In a non-limiting example, the control circuit 64 is provided in an IoT fog server 72, such as the fog server 18 of FIG. 1. The IoT fog server 72 is communicatively coupled to a mobile communication device 74 (e.g., a smartphone) via the selected communication medium 70. The control circuit 64 includes feature extraction circuitry 76, prediction circuitry 78, and translation circuitry 80. The feature extraction circuitry 76 is configured to receive a first type sensory data 82 via the input interface 66 and extract a number of signal features 84 from the received first type sensory data 82. In a non-limiting example, the signal features 84 can include frequency bands (e.g., δ band, θ band, α band, β band, and/or γ band) decomposed from the first type sensory data 82. The prediction circuitry 78 executes a predictive model to generate a defined number of predicted signal features 86 corresponding to a future time period. As discussed later in FIG. 6, the predictive model is configured to generate the defined number of predicted signal features 86 in at least one prediction window $t_W$ in the future time. The translation circuitry 80 receives the predicted signal features 86 from the prediction circuitry 78 and generates at least one predicted future mental state 88 based on the predicted signal features 86. In a non-limiting example, the predicted future mental state 88 can include the sleep state, the drowsy state, the relaxation state, the alertness state, and the perception state, as described previously in FIGS. 2A-2C. The predicted future mental state 88 may also include such emotional states as nervousness, non-nervousness, happiness, sadness, depression, and so on. Further, the predicted future mental state 88 may also reflect imaginations of a human brain, such as a word, a phrase, an image, a movie scene, or an action imagined by the human brain. The translation circuitry 80 is further configured to provide the predicted future mental state 88 to the output interface 68.

The mobile communication device 74 includes data sensing circuitry 90 and actuator circuitry 92. The data sensing circuitry 90 is coupled to the input interface 66 via the selected communication medium 70 and the actuator circuitry 92 is coupled to the output interface 68 via the selected communication medium 70. The data sensing circuitry 90 is also coupled to at least one primary sensor 94 configured to collect the first type sensory data 82. In a non-limiting example, the primary sensor 94 is at least one EEG sensor configured to collect low accuracy and low latency EEG data, which represents a human physiological response to a stimulus, as the first type sensory data 82. The data sensing circuitry 90 receives the first type sensory data 82 from the primary sensor 94 and provides the received first type sensory data 82 to the input interface 66 via the selected communication medium 70.

The BMoI system 60 includes at least one secondary sensor 96 configured to collect a second type sensory data 98. In a non-limiting example, the secondary sensor 96 is at least one ECG sensor configured to collect high accuracy and high latency ECG data, which represents a human psychological response to the stimulus. The data sensing circuitry 90 receives the second type sensory data 98 from the secondary sensor 96 and provides the received second type sensory data 98 to the input interface 66 via the selected communication medium 70. As explained next, the control circuit 64 can use the second type sensory data 98 to calibrate the predictive model to help improve accuracy of the predicted signal features 86 and, consequently, improve accuracy of the predicted future mental state 88.

In a non-limiting example, the predictive model executed by the prediction circuitry 78 is an Adaptive Network Fuzzy Inference Systems (ANFIS) model. ANFIS predicts a data sample in terms of a fixed number of previous data samples. In this regard, to predict the next p samples, also referred to as the prediction window $t_W$, previous features (nervousness levels) are provided as inputs ($x_{t-7}$, $x_{t-3}$, $x_{t-1}$, and $x_t$, where t indicates the current time stamp) to the ANFIS model to calibrate its parameters through a training phase. In the training phase, the parameters of ANFIS are found in such a way that the error between the model output ($x'_t$) and the target output ($x_t$) falls below a threshold or a fixed number of optimization iterations (epochs) are reached. The trained ANFIS can predict the future value of the nervousness level ($x_{t+1}$) based on previous and current values ($x_{t-7}$, $x_{t-3}$, $x_{t-1}$, and $x_t$). Subsequently, to predict the values of $x_{t+2}$ to $x_{t+p}$, the predicted value for $x_{t+1}$ is used as a part of input to predict $x_{t+2}$, and so forth.

According to the previous discussion of FIG. 2B, a human brain can respond to a stimulus (e.g., visual stimuli) in about 250 milliseconds, while changes in a human heart rate are only reflected after 3-4 seconds. In this regard, the second type sensory data 98 (ECG data) collected by the secondary sensor 96 (ECG sensor) lags the first type sensory data 82 (EEG data) collected by the primary sensor 94 (EEG sensor) by approximately 3-4 seconds. However, the second type sensory data 98 tends to be more accurate than the first type sensory data 82 with respect to reflecting some types of human physiological and psychological responses to the stimulus (e.g. nervousness levels). As such, it is possible to use the second type sensory data 98 to validate the predicted signal features 86 and calibrate the predictive model to improve accuracy of the predicted signal features 86.

Figure 9:
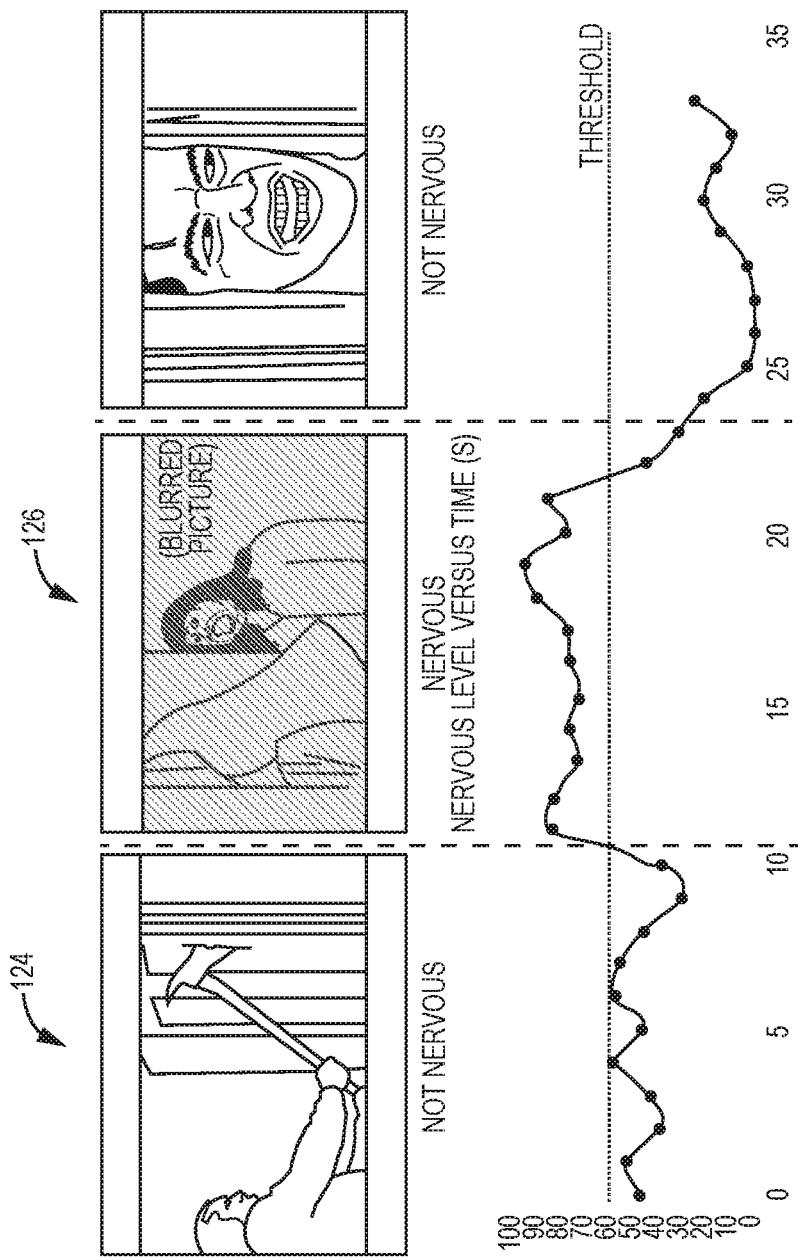
FIG. 9 is an exemplary illustration of a neuro-movie (nMovie) application that can be supported by the BMoI system of FIG. 3.

For example, a single dry electrode NeuroSky can be used as the primary sensor 94 to capture the first type sensory data 82 at 512 Hz. A health monitoring suite called Health-Dev that reads the second type sensory data 98 from a Shimmer ECG sensor is used to record the second type sensory data 98 (heart rate) at 1 Hz. Nervousness levels (0≤nerv_level≤100) are computed as the ratio between signal power in the α and β frequency bands of the first type sensory data 82 (EEG data). This interval can be divided into two areas (or states), nervous (e.g., nerv_level>60) and not nervous (e.g., nerv_level≤60), for example. However, according to brain wave characteristics, each subject may have a different threshold for nervousness. A baseline video is considered to set a specific threshold for each individual (e.g., ≈60 as shown in FIG. 9). In the translation circuitry 80, nervous state is recognized whenever the average nerv_level over the past 10 seconds is higher than the threshold.

Because of the dynamic behavior of brain signals, setting a static baseline threshold may reduce mental state recognition accuracy over time. To solve this issue, a hybrid method in the AMAC model that applies the second type sensory data 98 (ECG data) to proactively configure the nervousness threshold can be applied. Clinical studies show that a sudden rise of more than 8.9 beats per minute (bpm) in a baseline heart rate occurs during nervousness. As such, the heart rate feature is extracted from the second type sensory data 98 (ECG data) to adaptively update the nervousness level threshold as seen in Algorithm 1 below. Initially, nervous state is recognized when the nerv_level is higher than the baseline threshold. Each rise in the nervousness level may be followed by a rise in the heart rate within 3-4 s. If a rise in the nervousness level is not matched by a rise in heart rate, the threshold is increased by a small amount (δ). If a rise in heart rate is not preceded by a nervousness recognition, then the threshold is decreased by δ.

---

Algorithm 1 Adaptive multi-modal nervousness recognition

1: procedure NERVOUSNESSDETECTION
2:  mental_state ← {Not Nervous, Nervous}
3:  t ← elapsed time from start of the experiment
4:  Δt ← time difference in EEG and ECG responses
5:  ΔHR ← amount of rise in heart rate (e.g. here 8.9 bpm)
6:  thr ← average nerv_level during baseline video -continued Algorithm 1 Adaptive multi-modal nervousness recognition

```
 7:    δ ← tuning value
 8:    if nerv_level(t) > thr then
 9:       {mental_state ← Nervous.
10:       if HR(t + Δt) – HR(t) < ΔHR then
11:          thr ← thr + δ.}
12:    else
13:       {mental_state ← Not Nervous.
14:       if HR(t + Δt) – HR(t) > ΔHR then
15:          thr ← thr – δ.}
16:    goto Step 7.
```

The second type sensory data 98 (ECG data) is only used to calibrate the predictive model, and has no direct effect on the final mental state recognition results. In this sense, in one non-limiting example, after calibrating a pre-defined number of predicted future mental states based on the second type sensory data 98, the control circuit 64 can stop receiving the second type sensory data 98 (ECG data) and continue its operation based only on the first type sensory data 82 (EEG data). In another non-limiting example, the control circuit 64 can stop receiving and using the second type sensory data 98 (ECG data) after performing a defined number of calibration iterations on the predictive model. Notably, the temporary calibration mechanism using the second type sensory data 98 can save a considerable amount of processing time and power in the BMoI system 60, while improving accuracy of the predictive model.

The actuator circuitry 92 in the mobile communication device 74 receives the predicted future mental state 88 via the selected communication medium 70. Accordingly, the actuator circuitry 92 triggers an application-specific action in the BMoI application 62 executing in the mobile communication device 74. The BMoI application 62 also provides feedback 100 (e.g., visual stimuli, audible alert, vibration, etc.) to the user wearing the primary sensor 94.

Figure 4:
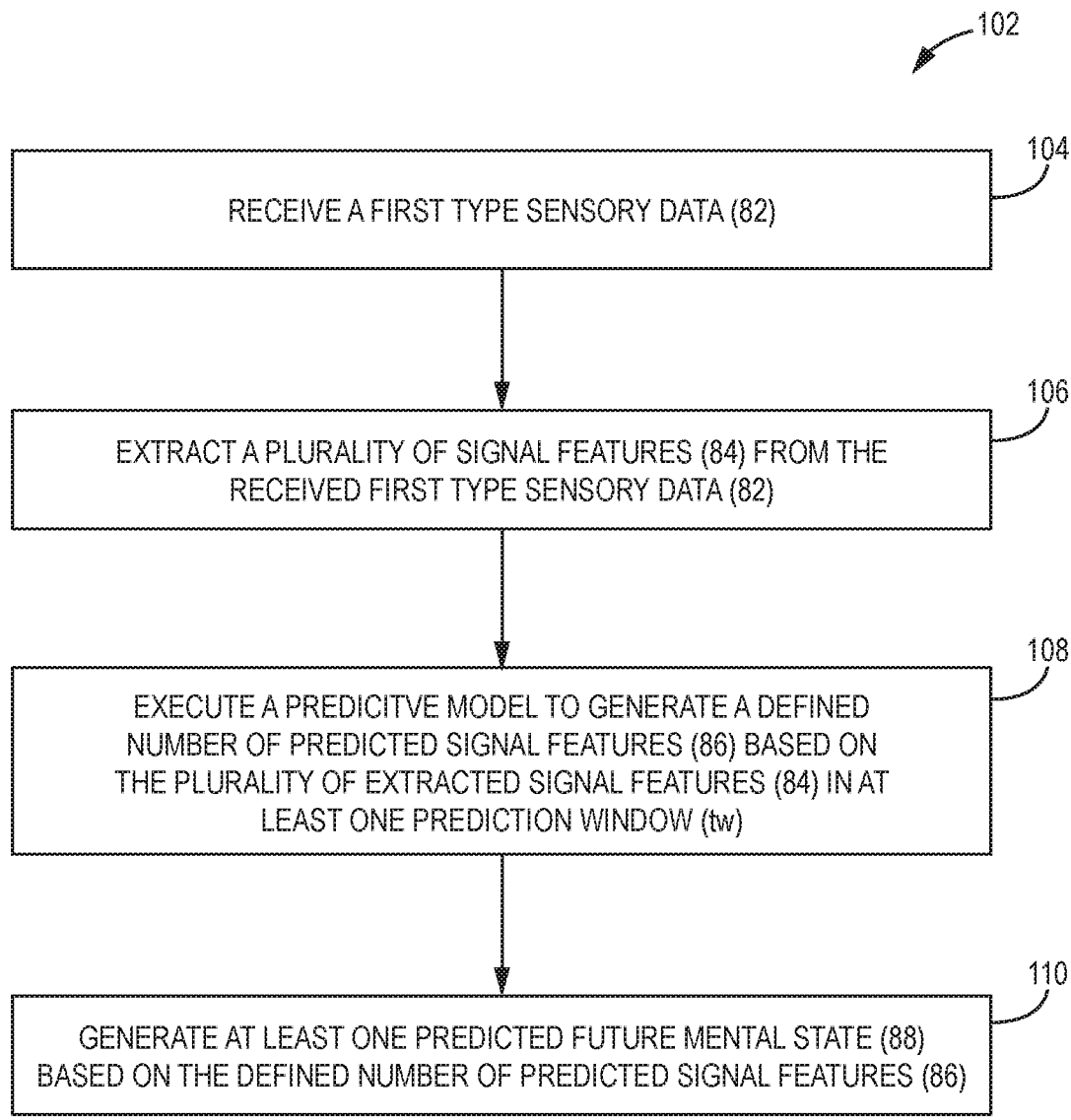
FIG. 4 is a flowchart of an exemplary process for optimizing the BMoI system of FIG. 3 for improved accuracy, latency, and power consumption.

The BMoI system 60 can be optimized to provide improved accuracy, latency, and power consumption according to a process. In this regard, FIG. 4 is a flowchart of an exemplary process 102 for optimizing the BMoI system 60 of FIG. 3 for improved accuracy, latency, and power consumption.

According to the process 102, the control circuit 64 receives the first type sensory data 82 (block 104). The control circuit 64 extracts the signal features 84 from the received first type sensory data 82 (block 106). The control circuit 64 executes the predictive model to generate the defined number of predicted signal features 86 based on the extracted signal features 84 in the prediction window $t_W$ (block 108). The control circuit 64 then generates the predicted future mental state 88 based on the defined number of predicted signal features 86 (block 110).

Figure 5:
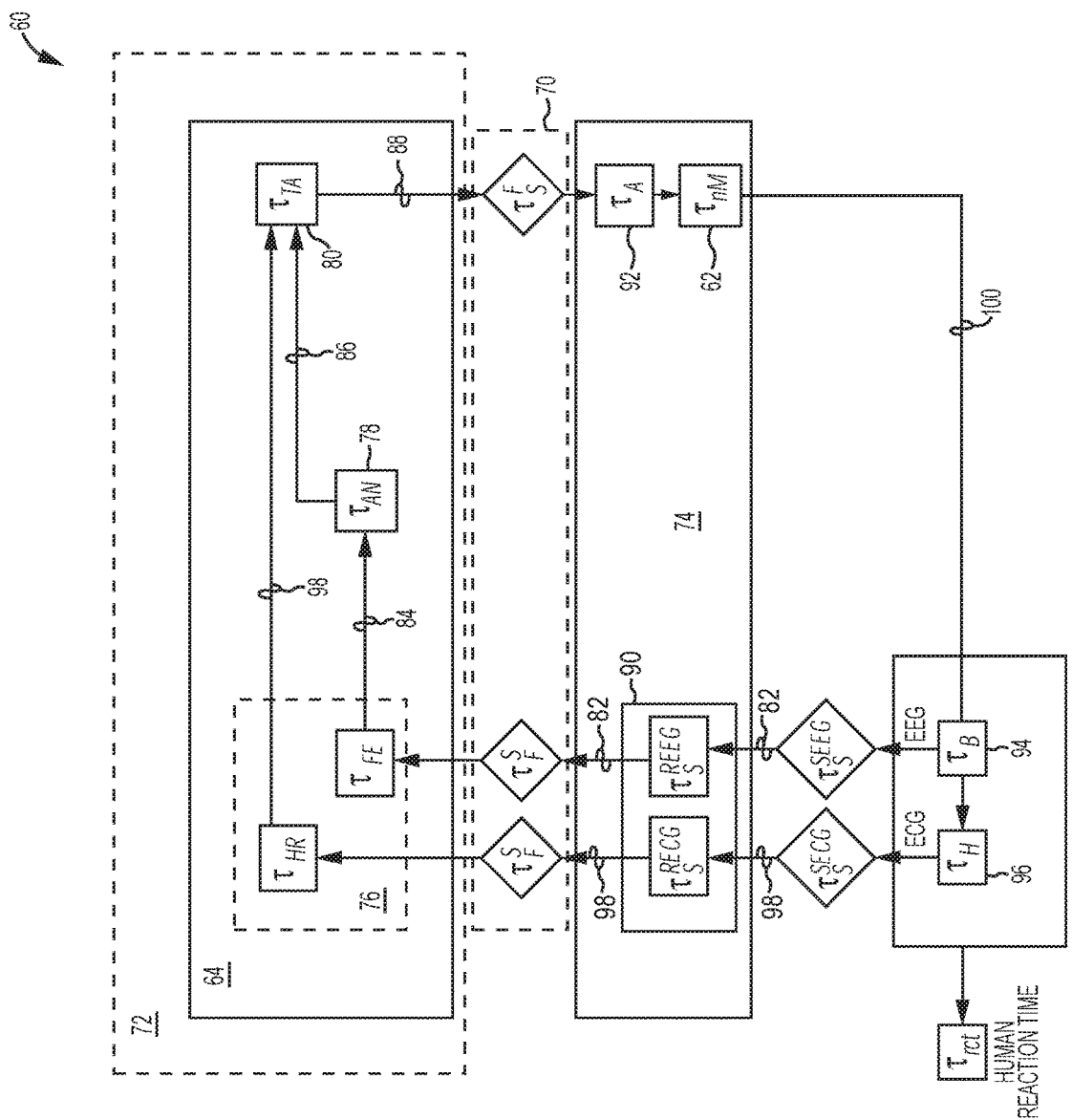
FIG. 5 is a schematic diagram providing an exemplary illustration of end-to-end delay of the BMoI system of FIG. 3.

As stated earlier, end-to-end latency analysis is performed to determine the appropriate timing constraint for the predictive model such that an overall end-to-end delay does not exceed the typical human response time to the stimulus, thus allowing the BMoI system 60 to operate in real-time. In this regard, FIG. 5 is a schematic diagram providing an exemplary illustration of the end-to-end delay of the BMoI system 60 of FIG. 3. Common elements between FIGS. 3 and 5 are shown therein with common element numbers and will not be re-described herein.

As shown in FIG. 5, a human brain has a response latency $\tau_B$. The primary sensor 94 (EEG sensor) and the secondary sensor 96 (ECG sensor) have communication latencies $\tau_S^{SEEG}$ and $\tau_S^{SECG}$, respectively. The data sensing circuitry 90 has latency $\tau_S^{REEG}$ in receiving the first type sensory data 82 (EEG data) and latency $\tau_S^{RECG}$ in receiving the second type sensory data (ECG data). Communication latency associated with transmitting from the mobile communication device 74 to the IoT fog server 72 is $\tau_F^S$ and communication latency associated with transmitting from the IoT fog server 72 to the mobile communication device 74 is $\tau_S^F$. The predictive model is associated with a computation latency $\tau_{AN}$. The feature extraction circuitry 76 has latencies $\tau_{FE}$ and $\tau_{HR}$ in processing the first type sensory data 82 (EEG data) and the second type sensory data 98 (ECG data) respectively. Execution time of the translation circuitry 80 in generating the predicted future mental state is $\tau_{TA}$. Operation time of the actuator circuitry 92 is $\tau_A$. Execution time of the BMoI application 62 is $\tau_{nM}$. Also, there is latency between the brain receiving a stimulus and the human body perceiving it, the reaction time $t_{rct}$.

For seamless operation and optimal user experience, the time elapsed from receiving a stimulus to computing and administering an actuation has to be less than the reaction time of the user, as expressed in equation (Eq. 1) below.

$$\tau_B \tau_S^{SEEG} + \tau_S^{REEG} + 2\tau_S^F \tau_{FE} \tau_{AN} + \tau_{TA} + \tau_A + \tau_{nM} \leq t_{rct} \quad \text{(Eq. 1)}$$

Figure 6:
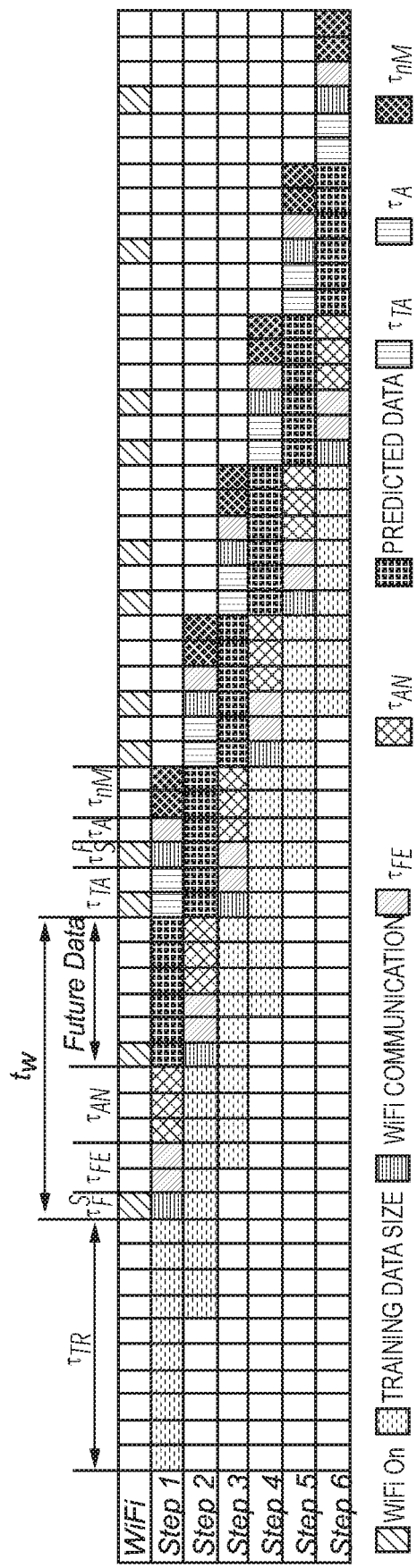
FIG. 6 is a schematic diagram providing an exemplary illustration of step-by-step execution of each component in the BMoI system of FIG. 3 based on Asynchronous Multi-sensory Model Predictive Control and feedback (AMMPC)

Hereinafter, only the latency related to the first type sensory data 82 (EEG data) is considered since the second type sensory data (ECG data) can be processed in a parallel thread and used only to adapt the control circuit 64 and calibrate the predictive model. FIG. 6 is a schematic diagram providing an exemplary illustration of step-by-step execution of each component in the BMoI system 60 of FIG. 3 based on AMMPC.

In AMMPC, the predictive model requires some amount of initial training data to operate. The time needed for receiving enough data from the primary sensor 94 to train the predictive model is $\tau_{TR}$. The prediction circuitry 78, which starts only after training data is available, takes $\tau_{AN}$ time to generate the predicted signal features 86. The subsequent execution of the prediction algorithm can choose $\tau_{TR}$ seconds of training data or slots, which can be overlapping.

The predictive model can be executed either in the IoT fog server 72 or in the mobile communication device 74. If the IoT fog server 72 is used, then the prediction model has to spend time in receiving the first type sensory data 82 (EEG data) from the mobile communication device 74 through the selected communication medium 70, and the IoT fog server 72 has to send the predicted future mental state 88 back to the mobile communication device 74 via the selected communication medium 70. However, the execution time of ANFIS in the mobile communication device 74 may be significantly higher than the execution time in the IoT fog server 72. It is a trade-off between computation and communication time. Given such a setting, the control circuit 64 can start with an initial latency of $\tau_{TR}$ (i.e., training data size). Once the control circuit 64 gets started, it invokes the actuator circuitry 92 specifically in periods less than $t_{rct}$. The prediction circuitry 78 with the most recent training data can only provide samples of the predicted signal features 86 in the prediction window $t_W$. Hence, the execution time $\tau_{AN}$ has to be less than $t_W$ to provide the predicted signal features 86 just in time to the translation circuitry 80. Thus, the execution time of the predictive model $\tau_{AN}$ should be less than one-half of the prediction window $t_W$ to maintain real-time execution of the control circuit 64.

The time taken to extract the signal features 84, $\tau_{FE}$, generate the predicted signal features 86, $\tau_{AN}$, and generate the predicted future mental state 88, $T_{TA}$, has to be less than a temporal duration of the prediction window $t_w$ to enable real-time execution. If $T_{FE}+T_{AN}+T_{TA} \leq t_w$, then the control circuit 64 gets instantaneous access to the $t_w-T_{FE}-T_{AN}-T_{TA}$ time window of future data. While the control circuit 64 is working with this amount of data, the predictive model has to compute the next $t_w$ predictions. However, the control circuit 64 has to receive the next predicted window $t_W$ in time, hence $T_{AN} \leq t_w-T_{FE}-T_{AN}-T_{TA}$. Accordingly the upper boundary latency of the predictive model is less than one-half ($\leq \frac{1}{2}$) of the temporal duration of the prediction window $t_W$, as expressed in equation (Eq. 2) below.

$$\tau_{AN} < \frac{t_w}{2} \quad \text{(Eq. 2)}$$

In a non-limiting example, the selected communication medium 70 can be provided as a Wi-Fi (e.g., infrastructure Wi-Fi or Wi-Fi Direct) communication link. Prediction in AMMPC may allow for duty cycling of WiFi radio in the mobile communication device 74 when the IoT fog server 72 is used. According to equation (Eq. 2), $T_{AN}$ has to be less than $t_w/2$ to ensure real-time operation through the use of the prediction circuitry 78. As shown in FIG. 6, when the IoT fog server 72 provides the predicted signal features 86 for $t_w$, the translation circuitry 80 can use the predicted signal features 86 to compute the predicted future mental state 88 (e.g., nervousness levels) and provide the predicted future mental state 88 to the actuator circuitry 92 ahead of time. For each execution on the IoT fog server 72, $t_c = \tau_{FE} + \tau_{AN} + \tau_{TA} + \tau_S^F$ amount of time is needed to obtain the predicted signal features 86, process the predicted signal features 86 to generate the predicted future mental state 88, and send the predicted future mental state 88 to the actuator circuitry 92. The next prediction should be done so that the actuator circuitry 92 receives the next prediction of the predicted future mental state 88 before $t_w$. Hence, the next transmission should start at $t_w-t_c$. In the meantime, the WiFi radio of the mobile communication device 74 can be shut down for a time equal to $\text{abs}(t_w-t_c) = 4\tau_S^F$, resulting in a duty cycling of $$100 \frac{t_w - t_c}{t_w} \%.$$

During the time in which the Wi-Fi radio of the mobile communication device 74 is shutdown, circuitry associated with the Wi-Fi radio is not consuming battery power from the mobile communication device 74, and thus energy efficiency is increased.

Figure 7:
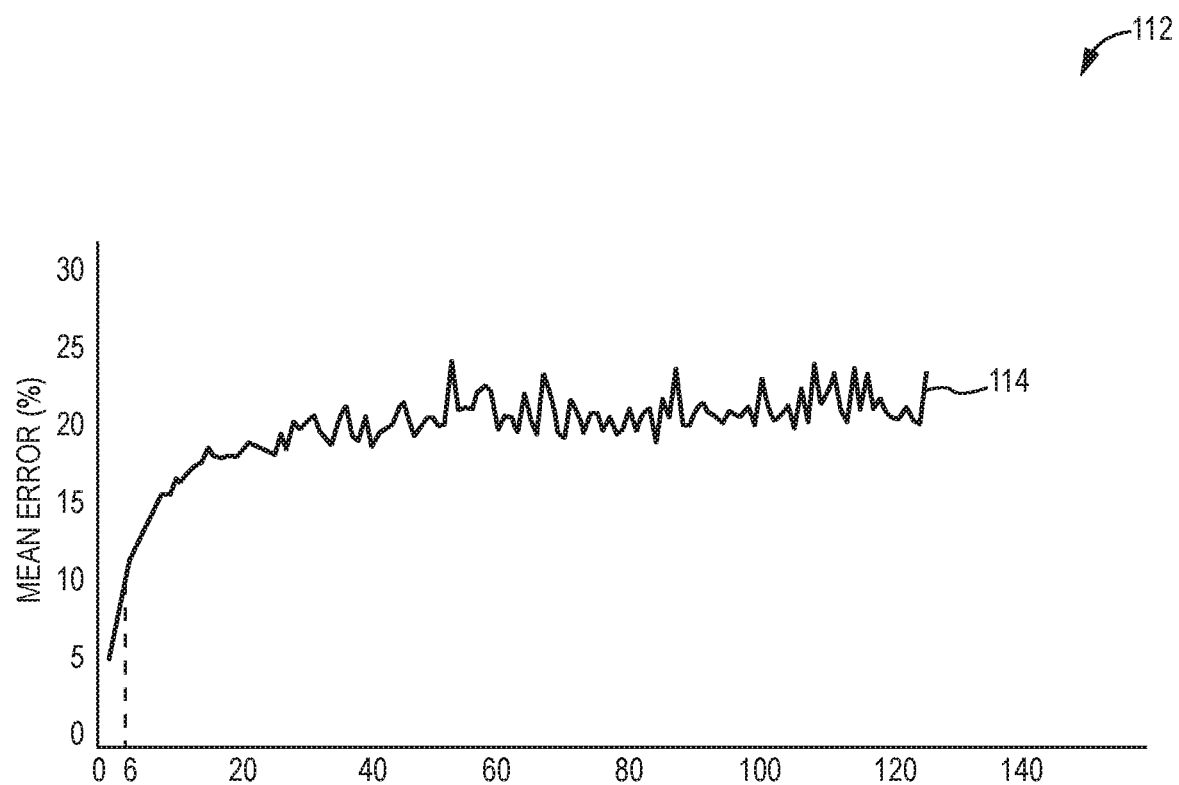
FIG. 7 is a graph providing an exemplary illustration of a relationship between a size of a prediction window and an average prediction error of a predictive model in the BMoI system of FIG. 3.

FIG. 7 is a graph 112 providing an exemplary illustration of a relationship between a size of the prediction window $t_W$ and an average prediction error of the predictive model of FIG. 3. Elements of FIG. 3 are referenced in conjunction with FIG. 7 and will not be re-described herein.

In the graph 112, the horizontal axis represents a number of the predicted signal features 86 in the prediction window $t_W$, and the vertical axis represents an average prediction error of the predicted signal features 86 corresponding to various sizes of the prediction window $t_W$. According to a curve 114, the average prediction error is positively related to the number of predicted signal features in the prediction window $t_w$. In this regard, to achieve a 10% average prediction error, the predictive model in the BMoI system 60 can be configured to generate six predicted signal features 86 in the prediction window $t_W$. Notably, in a BMoI system that is less sensitive to prediction accuracy, it may be possible to increase the number of predicted signal samples in the prediction window $t_W$ to further conserve power.

Figure 8:
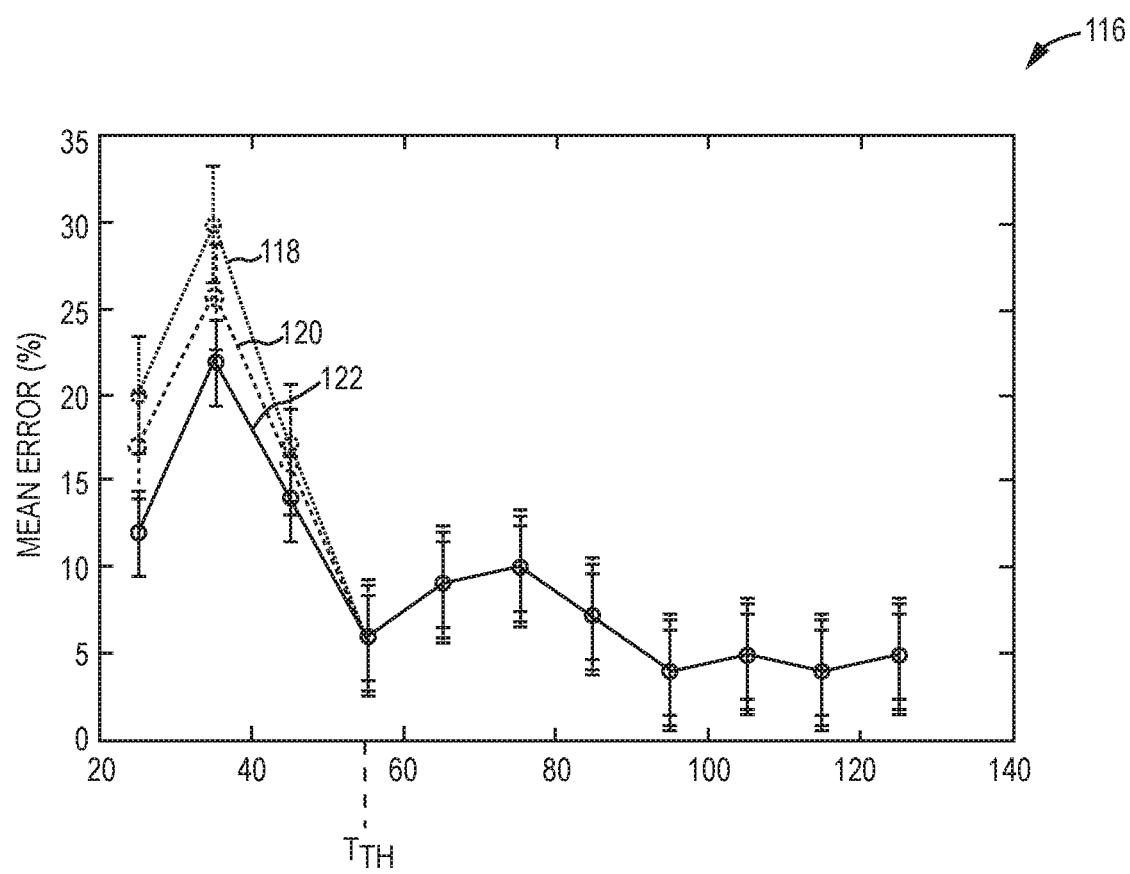
FIG. 8 is a graph providing an exemplary illustration of a relationship between a size of training data and an average prediction error of a predictive model in the BMoI system of FIG. 3.

FIG. 8 is a graph 116 providing an exemplary illustration of a relationship between a size of training data and an average prediction error of the predictive model of FIG. 3. Elements of FIG. 3 are referenced in conjunction with FIG. 8 and will not be re-described herein.

In the graph 116, the horizontal axis represents the size of the training data, and the vertical axis represents the average prediction error corresponding to various training data sizes. The graph 116 includes a first curve 118, a second curve 120, and a third curve 122 corresponding respectively to one optimization iteration (1 epoch), two optimization iterations (2 epochs), and three optimization iterations (3 epochs). As shown in FIG. 8, when the size of the training data is below a threshold $T_{TH}$, increasing the number of optimization iterations can lead to a reduction in the average prediction error. However, when the size of the training data reaches the threshold $T_{TH}$, increasing the number of optimization iterations does not improve the average prediction error.

With reference back to FIG. 3, in a non-limiting example, the BMoI application 62 can be a Neuro-Movie (nMovie) application. In this regard, FIG. 9 provides an exemplary illustration of some screen shots of the nMovie.

In the nMovie, the whole duration of the video is twenty five minutes. The first five minutes is a baseline video displaying peaceful nature scenes that make the viewer comfortable and relaxed in order to set a threshold for her nervousness level when she is not nervous. For the next 20 minute video, a collection of scary video clips from various thrillers is shown. Two versions of the scary part are prepared, the first version 124 is a sequence of original video clips, and the second version 126 is made by blurring the first version 124. Both the original and blurred videos are divided into five second segments. The points between each of the two segments are where the original or blurred versions are selected for demonstration. The actuator circuitry 92 receives the predicted future mental state 88 from the translation circuitry 80 and selects video segments according to a predicted mental state 99.

The nMovie application was tested on ten college students of ages between 20 and 30 (ethics approval and consent were obtained). For each subject there were two sessions. In the first session, the nMovie was played for her in which some scenes may have been blurred according to her mental state. In this session, if both the nervousness level and the heart rate showed that she was nervous, the current scene would be blurred. In the second session, the original version of the movie was played without any response to the viewer condition. But, EEG and ECG signals were still recorded in the second session and were used for a user experience study between watching the nMovie and the original movie. Each session took about 30 minutes, and the subjects were asked to relax on a chair and watch the movie with the least amount of movement. Due to displaying the same movie in the second session, the subject may have already anticipated the contents, which may have led to biased responses. Thus, to avoid habituation, the nMovie was intentionally shown in the first session, in which the subject would not be aware of the scary scenes since they were blurred.

One of the key challenges in brain research is to accurately recognize a mental state from brain data since it concerns an objective evaluation of a subjective variable. Typically, medical-grade brain data are initially calibrated for an individual by asking the user to annotate mental states or feelings while she/he is performing specific tasks. Translation algorithms then recognize mental states based on the brain data and annotations. In a mobile setting, the mental state recognition, especially using machine learning-based translation algorithms with elaborate training processes, is often not feasible and may hamper pervasive real-time operation. Further, the poor signal quality of smartphone-compatible wearable sensors may reduce the fidelity of the translation algorithm.

In the nMovie application, for validation of a user's mental state, an ECG sensor was used to measure a heart rate response of nervousness. In a preliminary experiment, a subject was asked to watch a scary movie (different from the videos used in nMovie) for about 1 h while the subject's EEG and ECG signals were monitored. The subject was also asked to write down the moments when she felt nervous. FIG. 10 provides an exemplary illustration of an expected correlation between EEG and ECG signals.

FIG. 10 includes a heart rate curve 128 and a nervousness level curve 130. As seen in FIG. 10, every rise in a nervousness level in the nervousness level curve 130 of a subject is succeeded by a sudden rise in heart rate in the heart rate curve 128. A rise in the nervousness level happens when the subject is nervous while watching a movie. Nearly 100% of the time when an individual notes that she is nervous, there is a rise in the nervousness level. This phenomenon is considered as ground truth in the experiment. A True Positive (TP) event is defined as when an individual feels nervous and the algorithm recognizes nervousness, and a False Positive (FP) is defined as when the algorithm recognizes nervousness but there is no nervous feeling. Accordingly, accuracy is defined as the equation (Eq. 3) below.

$$\text{Accuracy} = \frac{TP}{TP+FP} \quad (\text{Eq. 3})$$

Table 1 shows the best accuracy results for 5 out of 10 subjects. The accuracy in AMAC setting is 9% more than SSEC setting. Also, the accuracy of the recognition algorithm using predicted mental states in the AMMPC system model is 64%, which is, as expected, lower than that for AMAC. Although, SSEC and AMMPC have the same accuracies, AMMPC is real-time while SSEC is not. The results show that the mental state recognition accuracy increases when subsequent physiological responses are used to validate psychological inferences from brain data.

TABLE 1

Nervousness Detection Accuracy

| | Subject | | | | | |
|---|---|---|---|---|---|---|
| | 1 | 2 | 3 | 4 | 5 | Average |
| SSEC | 61% | 64% | 68% | 67% | 62% | 64% |
| AMAC | 69% | 76% | 78% | 79% | 63% | 73% |
| AMMPC | 61% | 76% | 54% | 75% | 54% | 64% |

There are two latency types for this system, which are communication and computation latencies, as reported in Table 2. The communication latency from the EEG headset to the phone is about 1 second and from the phone to the fog server and vice versa is about 425 milliseconds. On the other hand, the processing time of ANFIS on the fog server is about 145 milliseconds compared with implementation on a smartphone, which is about 1,950 milliseconds, for 125 training size and one epoch.

In this regard, FIG. 11 provides an exemplary illustration of a relationship between training data size and computation time. FIG. 11 includes a first curve 132, a second curve 134, and a third curve 136 illustrating the relationship between training data size and computation time with respect to one iteration, two iterations, and three iterations, respectively. As seen in FIG. 11, the sum of computation and communication latencies using the IoT fog server 72 for prediction is much less than local computation in the mobile communication device 74.

TABLE 2

Approximate Latencies for Each Component

| EEG headset to smartphone/CM | $\tau_S^{SEEG}$ | 1000 ms |
|---|---|---|
| ECG sensor to smartphone/CM | $\tau_S^{SECG}$ | 1910 ms |
| EEG sensing module on smartphone/CP (Java) | $\tau_S^{REEG}$ | 5 ms |
| EEG FE on smartphone/CP (Java) | $T_{FE}$ | 200 ms |
| EEG TA on smartphone/CP (Java) | $T_{TA}$ | 60 ms |
| ECG sensing module on smartphone/CP (Java) | $\tau_S^{RECG}$ | 10 ms |
| Heart rate calculation on smartphone/CP (Java) | $T_{HR}$ | 150 ms |
| Smartphone to fog server and vice versa/CM | $\tau_F^S$ | 425 ms |
| EEG FE on fog server (MATLAB)/CP | $T_{FE}$ | 75 ms |
| EEG TA on fog server (MATLAB)/CP | $T_{TA}$ | 25 ms |
| ANFIS on fog server (MATLAB)/CP | $T_{AN}$ | 145 ms |
| ANFIS on smartphone (Java)/CP | $T_{AN}$ | See FIG. 11 |
| Actuator on smartphone/CP (Java) | $T_A$ | 5 ms |
| nMovie module on smartphone/CP (Java) | $T_{nM}$ | 30 ms |

(CM—communication tasks; CP—computation tasks)

The temporal requirements for a BMoI system are given by the equation (Eq. 1) above. In case of nMovie, there exists latency between viewing a particular scene and its effect on the nervousness level of the brain. According to the different brain and heart response times to stressful situations, it might be physiologically impossible that at a given time the ECG and EEG responses for a given visual stimulus are synchronized. However, it is essential to provide an audiovisual feedback based on the EEG before the reaction time $t_{rct}$=300 milliseconds. Thus, ideally, between two actuations, the controller should complete its task in less than 300 milliseconds.

With reference back to FIG. 5, latencies in different components of SSEC can be derived. During an nMovie execution, once the EEG sensor has sensed psychological response to a scene, it takes $t_{res}^{EEG} = \tau_S^{SEEG}\tau + \tau_S^{REEG} + \tau_{FE} + \tau_{TA}\tau_A + \tau_{nM}$ time to blur or unblur a scene. To maintain a real-time operation of the nMovie and enhance user experience, the $t_{res}^{EEG}$ should be as minimal as possible, at least $t_{res}^{EEG} < t_{rct}$. Based on Table 2 results, $t_{res}^{EEG}$=1000+5+200+60+5+30=1300 milliseconds. Hence, an EEG response to an audiovisual feedback is only registered at the nMovie module after at least $t_{res}^{EEG} + \tau_B$=1300+250=1550 milliseconds. Thus, the blurring and unblurring actuation due to a change in mental state of the viewer is always delayed more than a second and is not real-time. Also, the nervousness recognition accuracy is low.

The AMAC architecture still suffers from the same real-time operational problem for the EEG sensor. In addition to heart reaction latency to stress (≈3 seconds), the ECG sensing component needs to compute the heart rate and send it to the smartphone. Computation of heart rate requires at least 5 seconds of ECG data, on which algorithms such as peak detection, filtering, and averaging are applied. The ECG sensor can be implemented such that initially it waits for 5 seconds to obtain enough raw data, and then it sends out a heart rate every second. Receiving ECG data on smartphone and heart rate computation takes $\tau_S^{SECG}+\tau_S^{RECG+\tau}{}_{HR}=2070$ milliseconds. Therefore, at a given time the EEG response at time t is due to a visual stimulus occurring at time t−300−250−1300=t−1850 milliseconds, and the ECG response for the same audiovisual stimulus is obtained at time t−1850+3000+2070=t+3220 milliseconds. Hence, if at a given time the AMAC controller uses the current EEG response to compute a nervousness level and the current ECG response to adjust the actuator parameters, it will be utterly misled and the decisions may contradict the user's state of mind. Instead, the controller decides based on the current EEG data and at a later time updates the actuator using the ECG response. Still, the AMAC has a latency of 1550 milliseconds and hence is not real time.

The AMMPC uses predictive model control, which is run in parallel with smartphone applications to reach near real-time operation. The latency in sending data from the phone to the fog server is $\tau_P^F$=425 milliseconds, the computation time for ANFIS using MATLAB on fog server is $\tau_{AN}$=145 milliseconds, while another $\tau_F^S$=425 milliseconds is spent in transferring the predicted features from the fog server to the smartphone. Hence, overall latency in sending $t_w$=6 seconds worth of predicted data is around $\tau_{AN}+2\tau_S^F$=995 milliseconds. According to equation (Eq. 2), $\tau_{AN}<t_w/2$, hence usage of fog server enables real-time execution of the controller.

With reference back to FIG. 8, accurate ANFIS execution does not enable real-time operation. However, if accuracy can be compromised by changing the amount of training and number of epochs in ANFIS, the smartphone local computation may complete within $t_w/2$ milliseconds. According to FIGS. 8 and 11, one epoch for the smartphone implementation with 7.35% error can finish execution in about 1990 milliseconds, which facilitates real-time execution according to equation (Eq. 2). For a faster smartphone implementation, a single epoch and only 45 seconds of training data can be used with an execution time of ≈885 milliseconds and 9.95% error. In conclusion, smartphone local computation suffices for real-time execution of brain predictive models if (a) execution can be finished within human body response latency, (b) the prediction window is large enough that the controller can finish execution, and (c) accuracy of prediction can be sacrificed to reduce computational complexity and latency.

Those skilled in the art will recognize improvements and modifications to the preferred embodiments of the present disclosure. All such improvements and modifications are considered within the scope of the concepts disclosed herein and the claims that follow.

What is claimed is:

1. A Brain-Mobile Interface (BMoI) system comprising:
an input interface coupled to a selected communication medium;
an output interface coupled to the selected communication medium; and
a control circuit coupled to the input interface and the output interface and configured to:
receive a first type sensory data via the input interface;
receive a second type sensory data via the input interface within a time window from receiving the first type sensory data;
extract a plurality of signal features from the received first type sensory data;
execute a predictive model to generate a defined number of predicted signal features in at least one prediction window based on the plurality of extracted signal features;
validate the defined number of predicted signal features based on the second type sensory data;
generate at least one predicted future mental state based on the defined number of predicted signal features; and
provide the at least one predicted future mental state to the output interface.

2. The BMoI system of claim 1 wherein the control circuit is further configured to execute the predictive model to generate six predicted signal features in the at least one prediction window based on the plurality of extracted signal features.

3. The BMoI system of claim 1 wherein:
the at least one prediction window corresponds to a temporal duration; and
the control circuit is further configured to execute the predictive model to generate the defined number of predicted signal features in the at least one prediction window in less than one-half of the temporal duration.

4. The BMoI system of claim 1 wherein the control circuit comprises:
feature extraction circuitry configured to receive the first type sensory data and extract the plurality of signal features from the received first type sensory data;
prediction circuitry configured to execute the predictive model based on the plurality of extracted signal features to generate the defined number of predicted signal features in the at least one prediction window; and
translation circuitry configured to generate the at least one predicted future mental state based on the defined number of predicted signal features and provide the at least one predicted future mental state to the output interface.

5. The BMoI system of claim 1 further comprising:
at least one primary sensor configured to collect the first type sensory data;
at least one secondary sensor configured to collect the second type sensory data; and
data sensing circuitry configured to:
receive the first type sensory data from the at least one primary sensor;
receive the second type sensory data from the at least one secondary sensor; and
provide the first type sensory data and the second type sensory data to the input interface over the selected communication medium.

6. The BMoI system of claim 5 wherein:
the at least one primary sensor comprises at least one electroencephalogram (EEG) sensor configured to collect low accuracy and low latency EEG data representing human physiological response to a stimulus; and
the at least one secondary sensor comprises at least one electrocardiogram (ECG) sensor configured to collect high accuracy and high latency ECG data representing human psychological response to the stimulus.

7. The BMoI system of claim 5 wherein the control circuit is further configured to receive the second type sensory data via the input interface and calibrate the predictive model based on the received second type sensory data.

8. The BMoI system of claim 5 wherein the control circuit is further configured to stop receiving the second type sensory data in response to a pre-defined number of predicted future mental states being validated based on the second type sensory data.

9. The BMoI system of claim 5 wherein the control circuit is further configured to stop receiving the second type sensory data after calibrating the predictive model for a defined number of calibration iterations.

10. The BMoI system of claim 5 further comprising:
    an Internet-of-Things (IoT) fog server comprising the control circuit, the input interface, and the output interface; and
    a mobile communication device comprising the data sensing circuitry.

11. The BMoI system of claim 10 wherein the mobile communication device further comprises actuator circuitry communicatively coupled to the output interface via the selected communication medium and configured to trigger an application-specific action in the mobile communication device in response to receiving the at least one predicted future mental state.

12. A method for optimizing a Brain-Mobile Interface (BMoI) system using Internet-of-Things (IoT) comprising:
    receiving a first type sensory data;
    receiving a second type sensory data within a time window from receiving the first type sensory data;
    extracting a plurality of signal features from the received first type sensory data;
    executing a predictive model to generate a defined number of predicted signal features based on the plurality of extracted signal features in at least one prediction window;
    validating the defined number of predicted signal features based on the second type sensory data; and
    generating at least one predicted future mental state based on the defined number of predicted signal features.

13. The method of claim 12 further comprising generating six predicted signal features in the at least one prediction window based on the plurality of extracted signal features.

14. The method of claim 12 further comprising executing the predictive model to generate the defined number of predicted signal features in less than one-half of a temporal duration of the at least one prediction window.

15. The method of claim 12 further comprising:
    receiving the first type sensory data from at least one primary sensor; and
    receiving the second type sensory data from at least one secondary sensor.

16. The method of claim 15 further comprising calibrating the predictive model based on the received second type sensory data.

17. The method of claim 15 further comprising stopping receiving the second type sensory data in response to a pre-defined number of predicted future mental states being validated based on the second type sensory data.

18. The method of claim 15 further comprising stopping receiving the second type sensory data after calibrating the predictive model for a defined number of calibration iterations.

19. The method of claim 15 further comprising:
    communicatively coupling a mobile communication device to an IoT fog server via a selected communication medium;
    coupling the mobile communication device to the at least one primary sensor and the at least one secondary sensor;
    configuring the mobile communication device to:
        receive the first type sensory data from the at least one primary sensor;
        receive the second type sensory data from the at least one secondary sensor; and
        provide the first type sensory data and the second type sensory data to the IoT fog server via the selected communication medium; and
    configuring the IoT fog server to:
        extract the plurality of signal features from the received first type sensory data;
        execute the predictive model to generate the defined number of predicted signal features based on the plurality of extracted signal features in the at least one prediction window;
        generate the at least one predicted future mental state based on the defined number of predicted signal features; and
        provide the at least one predicted future mental state to the mobile communication device via the selected communication medium.

20. The method of claim 19 further comprising configuring the mobile communication device to trigger an application-specific action in response to receiving the at least one predicted future mental state.

* * * * *